(12) United States Patent
Le Cam et al.

(10) Patent No.: US 11,960,958 B1
(45) Date of Patent: Apr. 16, 2024

(54) NOTIFYING USERS OF MISSING ITEMS AT TIME OF LEAVING A LOCATION

(71) Applicant: KIPIT, INC., New York, NY (US)

(72) Inventors: Sarah Dorine Le Cam, New York, NY (US); Elizabeth Grace Harkins, New York, NY (US); Robert Shane Luttrell, Memphis, TN (US)

(73) Assignee: KIPIT, INC., New York, NY (US)

( * ) Notice: Subject to any disclaimer, the term of this patent is extended or adjusted under 35 U.S.C. 154(b) by 0 days.

(21) Appl. No.: 17/384,482

(22) Filed: Jul. 23, 2021

Related U.S. Application Data

(63) Continuation of application No. 16/816,037, filed on Mar. 11, 2020, now Pat. No. 11,074,421.

(60) Provisional application No. 62/816,335, filed on Mar. 11, 2019.

(51) Int. Cl.
*G06K 7/10* (2006.01)
(52) U.S. Cl.
CPC ............... *G06K 7/10366* (2013.01)
(58) Field of Classification Search
CPC .... G06K 7/10366; H04W 4/80; G08B 21/245
USPC ........................................................ 235/451
See application file for complete search history.

(56) References Cited

U.S. PATENT DOCUMENTS

| | | | |
|---|---|---|---|
| 9,978,100 B2 | 5/2018 | Mack | |
| 10,824,923 B1 * | 11/2020 | Forster | G06V 20/00 |
| 11,145,183 B2 * | 10/2021 | Daoura | G08B 21/0227 |
| 2012/0322380 A1 | 12/2012 | Nannarone et al. | |
| 2016/0005284 A1 | 1/2016 | Batra et al. | |
| 2016/0268696 A1 | 9/2016 | Hosseini et al. | |
| 2017/0323209 A1 | 11/2017 | Rinzler et al. | |
| 2020/0004995 A1 | 1/2020 | Kawaguchi et al. | |
| 2020/0012127 A1 * | 1/2020 | Howell | G02C 5/14 |
| 2020/0258182 A1 | 8/2020 | Bentley et al. | |
| 2022/0165146 A1 * | 5/2022 | Daoura | H04W 8/005 |

* cited by examiner

*Primary Examiner* — Ahshik Kim
(74) *Attorney, Agent, or Firm* — Foley & Lardner LLP

(57) ABSTRACT

Disclosed herein are systems and methods for notifying users regarding a status of various tracked items. A system for generating these notifications comprises a tracking device, having a unique identifier, using a short-range wireless communication protocol to communicate its location; and a mobile device comprising a motion detector configured to identify/monitor movements of the mobile device; and a reader using a short-range wireless communication protocol to communicate with the tracking device. Upon receiving an indication, from the motion detector, that the mobile device has a motion that satisfies a threshold, the reader identifies one or more tracking devices within the predetermined distance from the mobile device, wherein when the reader determines that the tracking device is not within the predetermined distance and the unique identifier of the tracking device is associated with the mobile device, the mobile device outputs a notification.

20 Claims, 27 Drawing Sheets

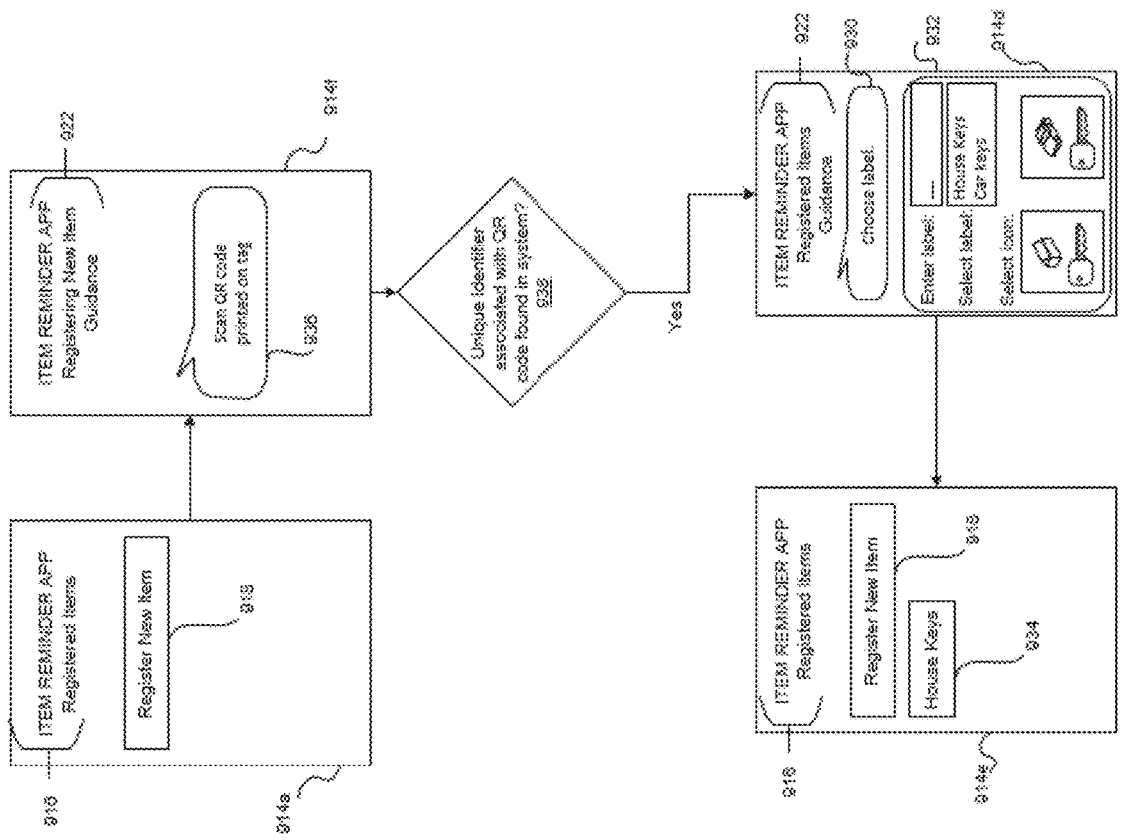

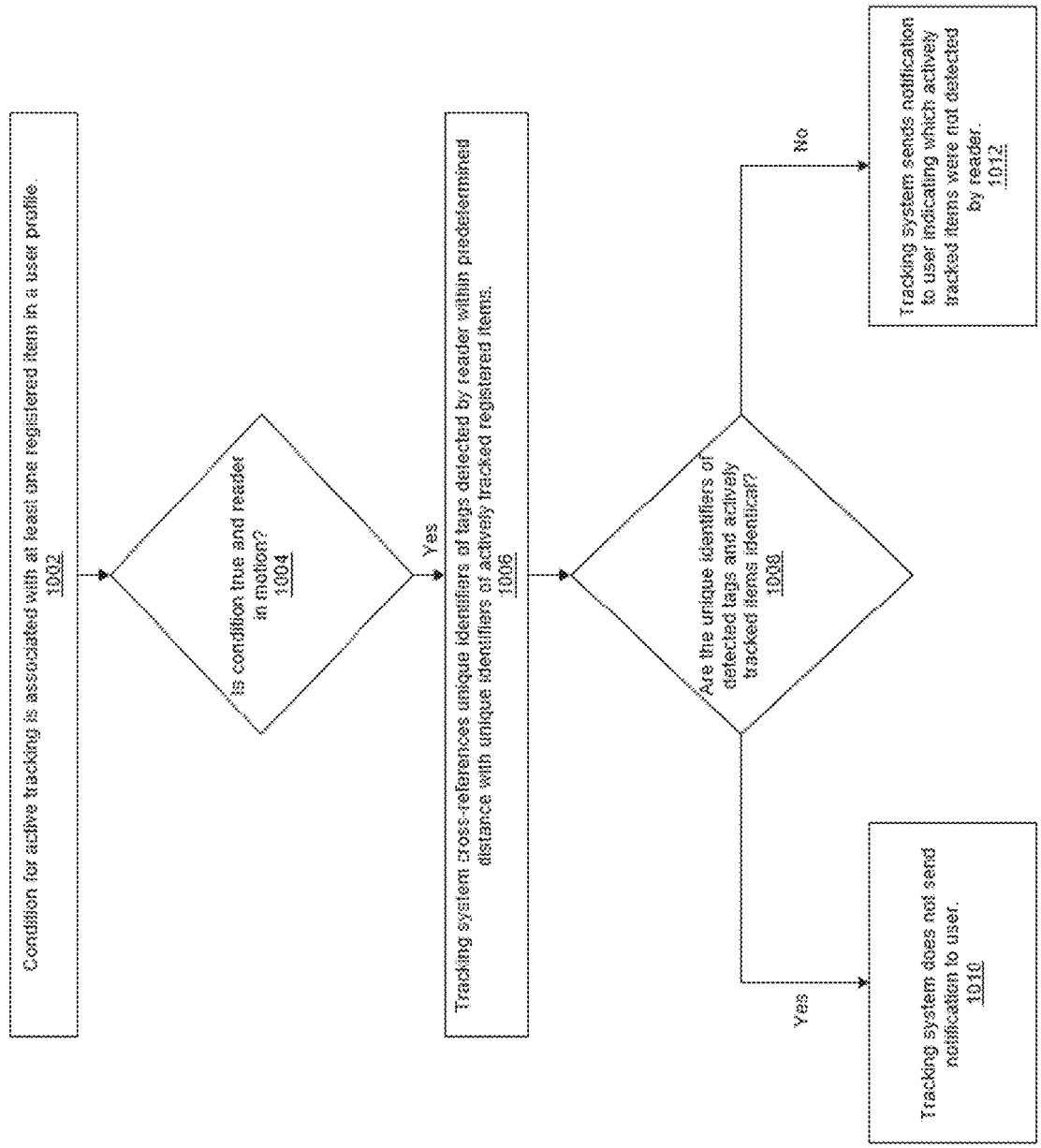

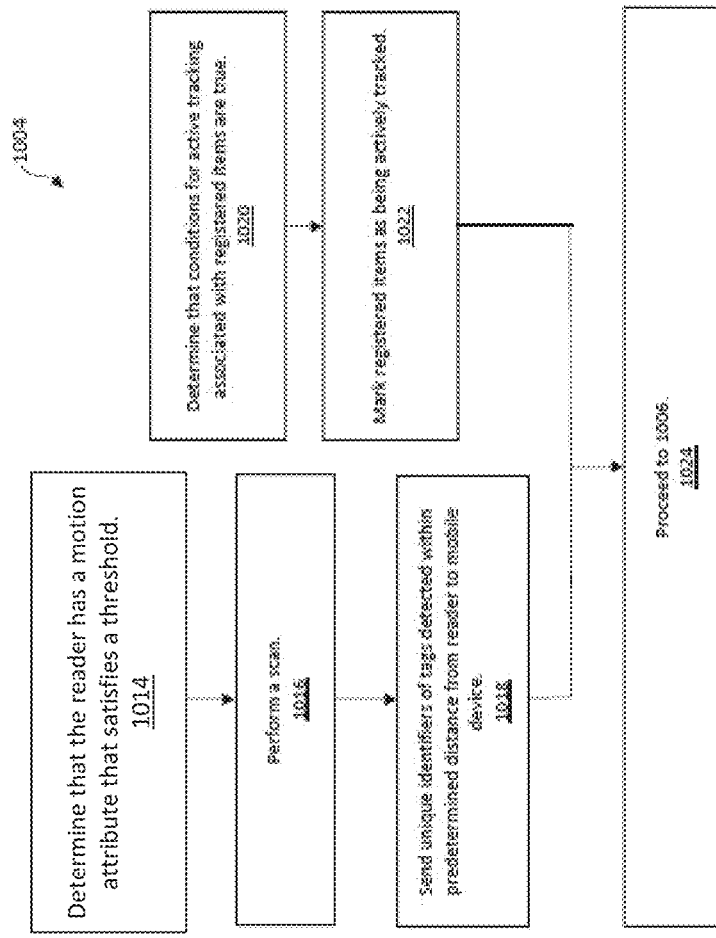

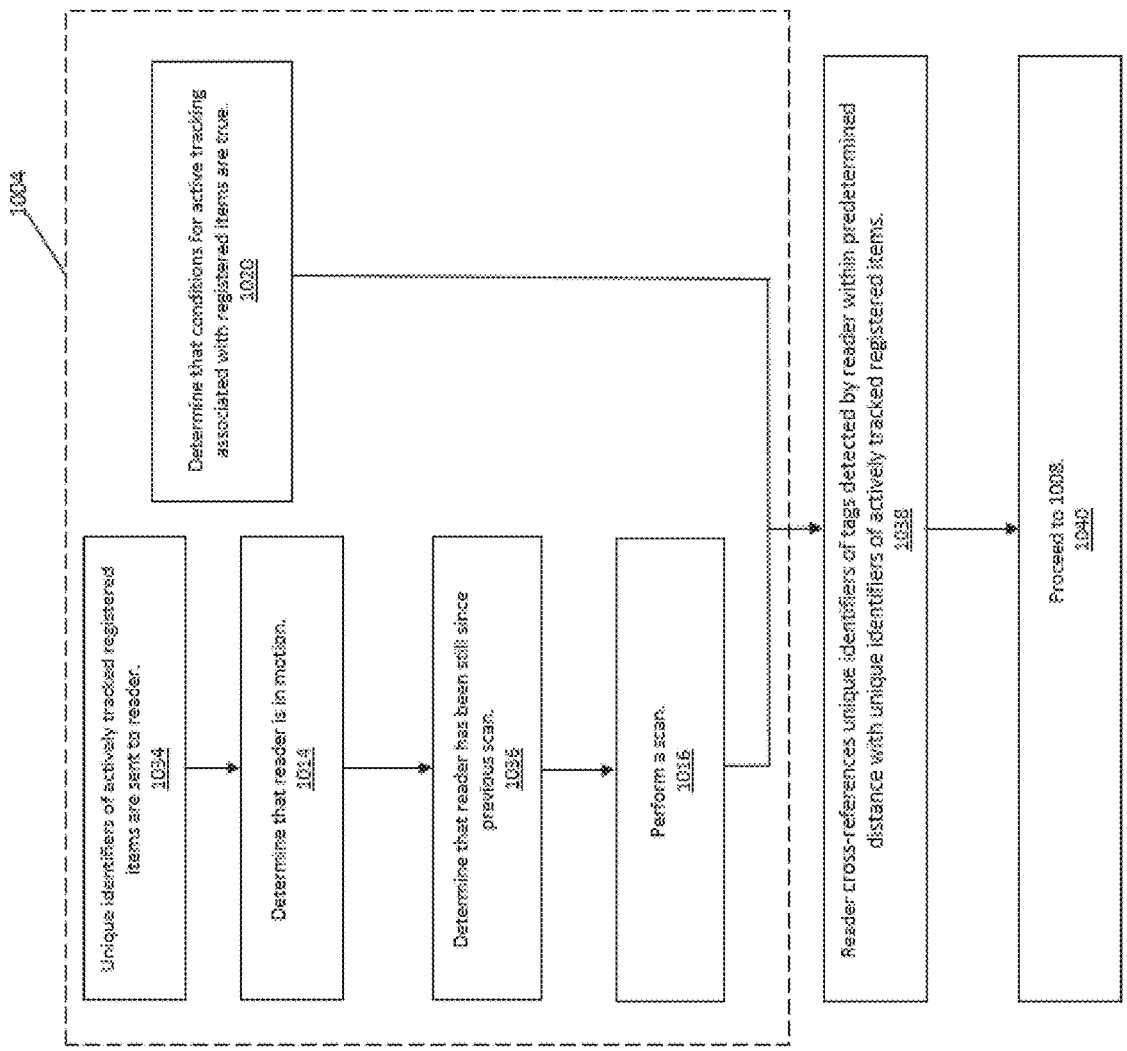

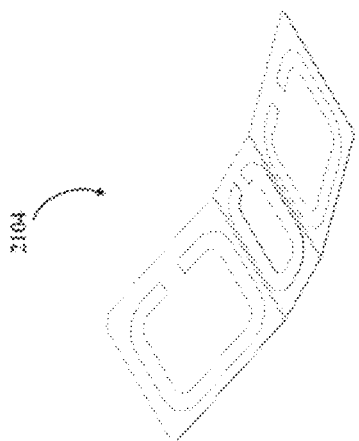
FIG. 21A
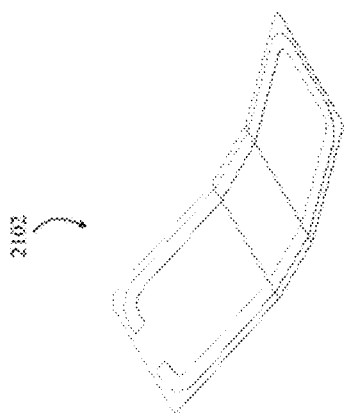
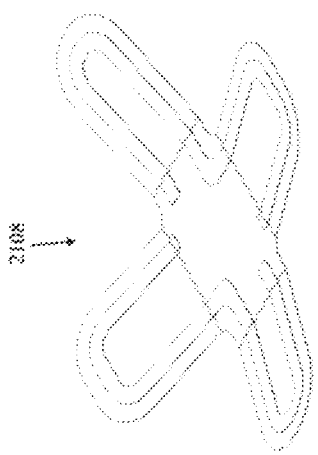
FIG. 21B
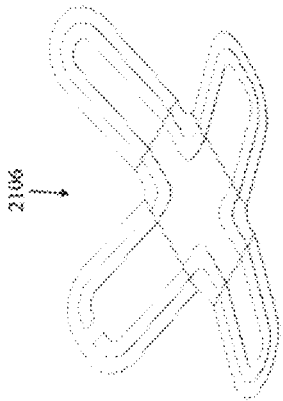
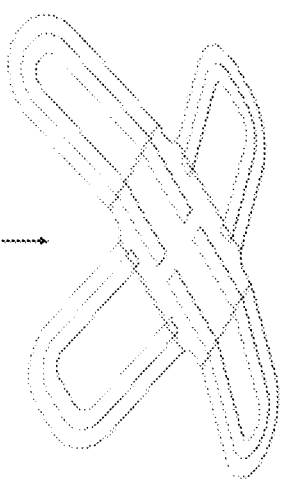

NOTIFYING USERS OF MISSING ITEMS AT TIME OF LEAVING A LOCATION

CROSS-REFERENCE TO RELATED PATENT APPLICATIONS

This application is a continuation of U.S. patent application Ser. No. 16/816,037, filed Mar. 11, 2020, which claims priority to U.S. Provisional Application Ser. No. 62/816,335, filed Mar. 11, 2019, each of which is incorporated by reference in its entirety.

TECHNICAL FIELD

The disclosure relates to the field of item tracking through tags, and more specifically detecting missing items and notifying users.

BACKGROUND

As the processing power of computers allow for greater computer functionality and the Internet technology era allows for interconnectivity between computing systems, many users utilize electronic tracking systems to identify the location of different devices, such as electronic/mobile devices or other items. Conventional electronic tracking systems typically use various tracking protocols (e.g., GPS, beacons, and Bluetooth technology) to monitor the location of various devices/items. For instance, a user can use conventional electronic tracking systems to view the location of his/her mobile device when he/she is unable to find his/her mobile device. Conventionally, when the user determines that an item is lost, the user can access an electronic platform (e.g., mobile application or a website) to view the location of the lost item. However, existing electronic tracking methods do not provide proactive notifications before the user leaves a location without a particular item.

SUMMARY OF THE INVENTION

For the aforementioned reasons, there is a desire for improved approaches to allow a tracking system to scan for nearby items at appropriate times (e.g., when a user is at risk of forgetting an item) and thus reduce the need for the user to retroactively monitor his/her items. Disclosed herein are personal item tracking systems and methods that use short-range wireless communication technology and wireless tags attached to items to notify users that they may not be in possession of an item that they may later need.

Disclosed herein are systems, devices, and methods that remind users regarding whether they are in possession of certain items. The methods and systems disclosed herein remind a user to leave a current location in possession of items that the user may need when the user is no longer in his/her current location. In one embodiment, a user is about to leave the user's house in the morning for work and is notified by the system if the user is not in possession of an item that the user may need for work, such as a laptop. In another embodiment, a user is about to leave the user's office for a meeting and is notified by the system if the user is not in possession of an item that the user may need for the meeting, such as a presentation folder. In yet another embodiment, a user is about to leave a camping site after a vacation and is notified by the system if the user is not in possession of an item that the user used while camping, such as a tent.

The disclosed system checks for possession of items by employing a device (herein referred to as a "reader") that uses short-range wireless communication technology and tags that are attached to or enclosed in a user's items and that can be detected by the reader. When the reader is near the user and does not detect a specific tag within some predetermined distance, it can be assumed that the item associated with that specific tag is not near the user. Therefore, should the user leave the user's current location, if not notified by the system, the user would leave the current location without having possession of the item. In different embodiments, the disclosed system would notify a user, for example, that the user is about to leave the user's house without a laptop of the user in the user's bag, or leave the user's office without carrying a presentation folder, or leave a camping site without a camping item, such as a tent, in the car, before the user has left.

In order for a reader to be near a user when the user is about to leave the user's current location, the reader can be placed or embedded in, or attached to, many items such as a bag, or a jacket, or a car. These are examples of items that the user designates as associated with leaving a user's current location and is unlikely to leave without. In one embodiment, when a user would like to leave the user's house in the morning with all work-related items and knows the user always carries a particular bag to work, the user may place a reader in the bag so that not detecting the tag of a work-related item would mean that this work-related item is not in the bag when the user leaves for work. In another embodiment, when a user would like to leave the user's office to go to a meeting with all meeting materials and knows that the user will be wearing a jacket, but would not be carrying a bag to the meeting, the user may place a reader in a jacket's pocket so that not detecting a tag of a meeting material would mean that the meeting material is not carried by the user when the user leaves for the meeting.

In another embodiment, when a user would like to leave a camping site to return home without leaving camping items behind and knows the user will be using a car to drive away from the camping site, the user may place a reader in a glove compartment of the car so that not detecting the tag of a camping item would mean that the camping item is not in the car when the user leaves the camping site. Other examples of such items (herein referred to as "designated containers" or "designated container" in the singular) can be, but are not limited to, placing a reader in a baby stroller to check for possession of items needed for the baby during an afternoon stroll, embedding a reader in a luggage lining to check for possessions of items needed for a trip, and others.

In some embodiments, a reader may not be embedded (e.g., attached to or housed within) within a user mobile device because such a mobile device with an embedded reader (e.g., an embedded component that can communicate with tags) may create numerous unnecessary notifications for missing items when the user is not yet leaving the user's current location. A mobile device is likely to accompany the user in temporary movements within a user's current location when not being able to detect a specific tag would not mean that the user is about to leave the user's current location without the undetected tag's item. For example, before leaving a user's house for work in the morning, a user may move from a first room of the house to a second room while carrying the user's mobile device. In the second room, a reader embedded, or attached to, the mobile device would not detect tags of work-related items that are placed in the first room. However, a notification, in this case, would not be needed since the user is not yet about to leave the house.

In another example, a user may be moving from a first section in a user's office to a second section while carrying the user's mobile device with an embedded reader, but a notification for not detecting meeting items placed in the first section would not be needed since the user is not yet about to leave the office to go to a meeting. Nonetheless, based on the movement of the mobile device with embedded reader around the house or the office, and on not detecting the work-related or meeting items, the system may interpret this as the user is leaving of the current location without necessary items and generate an unneeded and unwelcome missing items notification to a user who is already overwhelmed with multiple notifications from numerous other apps.

By using a separate reader, which is placed or embedded in a designated container, such as a bag, which would likely move only when a user is leaving the house, a missing items notification would be generated only when leaving the current location. This approach spares the user of unnecessary notifications. A mobile device, described in more details below, is utilized to provide notifications to the user as well as to allow the user to interact with a tracking system through a user interface, as also described below. Thus, the system takes advantage of capabilities in existing mobile devices without a need to replicate them in a reader. The mobile device and the reader communicate through any short-range wireless communication technology. In one configuration, a mobile device and a reader communicate through a Bluetooth connection.

In an embodiment, a system comprises a tracking device using at least one short-range wireless communication protocol to communicate an indication regarding whether the tracking device is within a range from a reader, the tracking device having a unique identifier, the tracking device further being associated with an item; and the reader using at least one short-range wireless communication protocol to communicate with the tracking device, the reader configured to upon a motion detector indicating that the reader has moved from a still position to a moving position and has a motion attribute that satisfies a threshold, scan to determine if the tracking device is within the range from the reader, wherein when the reader determines that the tracking device is not within the range from the reader, a notification identifying the item associated with the tracking device is transmitted.

In another embodiment, a method comprises, upon a motion detector indicating that a reader has moved from a still position to a moving position and has a motion attribute that satisfies a threshold, scanning, by the reader, to determine if a tracking device is within a range from the reader, wherein the tracking device uses at least one short-range wireless communication protocol to communicate an indication regarding whether the tracking device is within the range from the reader, the tracking device having a unique identifier, the tracking device further being associated with an item, wherein the reader uses at least one short-range wireless communication protocol to communicate with the tracking device, and wherein when the reader determines that the tracking device is not within the range from the reader, a notification identifying the item associated with the tracking device is transmitted.

BRIEF DESCRIPTION OF THE DRAWINGS

FIG. 9C is a flowchart of a user interface of a registration of an item to be tracked to be used in a tracking system, according to one embodiment.

FIG. 10A is a flowchart of a process for checking for possession of an item to be used in a tracking system, according to one embodiment.

FIG. 10B is a flowchart of a process for determining if a condition is true and a reader is in motion to be used in a tracking system, according to one embodiment.

FIG. 10D is a flowchart of a process for determining if a condition is true and a reader is in motion to be used in a tracking system, according to one embodiment.

FIG. 21A depicts coil configurations to be used in a rectangular bag reader, according to one embodiment.

FIG. 21B depicts coil configurations to be used in a plus-shaped bag reader, according to one embodiment.

DETAILED DESCRIPTION

Figures and flow charts presented below will describe multiple embodiments of methods and systems to notify users when they leave a location without one or more tagged items. The methods and system described herein utilize tracking devices associated with (e.g., embedded within or attached) items and readers using wireless communication protocols to communicate with the tracking devices to notify users before the users leave their locations without bringing their needed items. While various aspects and embodiments have been disclosed, other aspects and embodiments are contemplated. The various aspects and embodiments disclosed are for purposes of illustration and are not intended to be limiting, with the true scope and spirit being indicated by the following claims.

Figure 1:
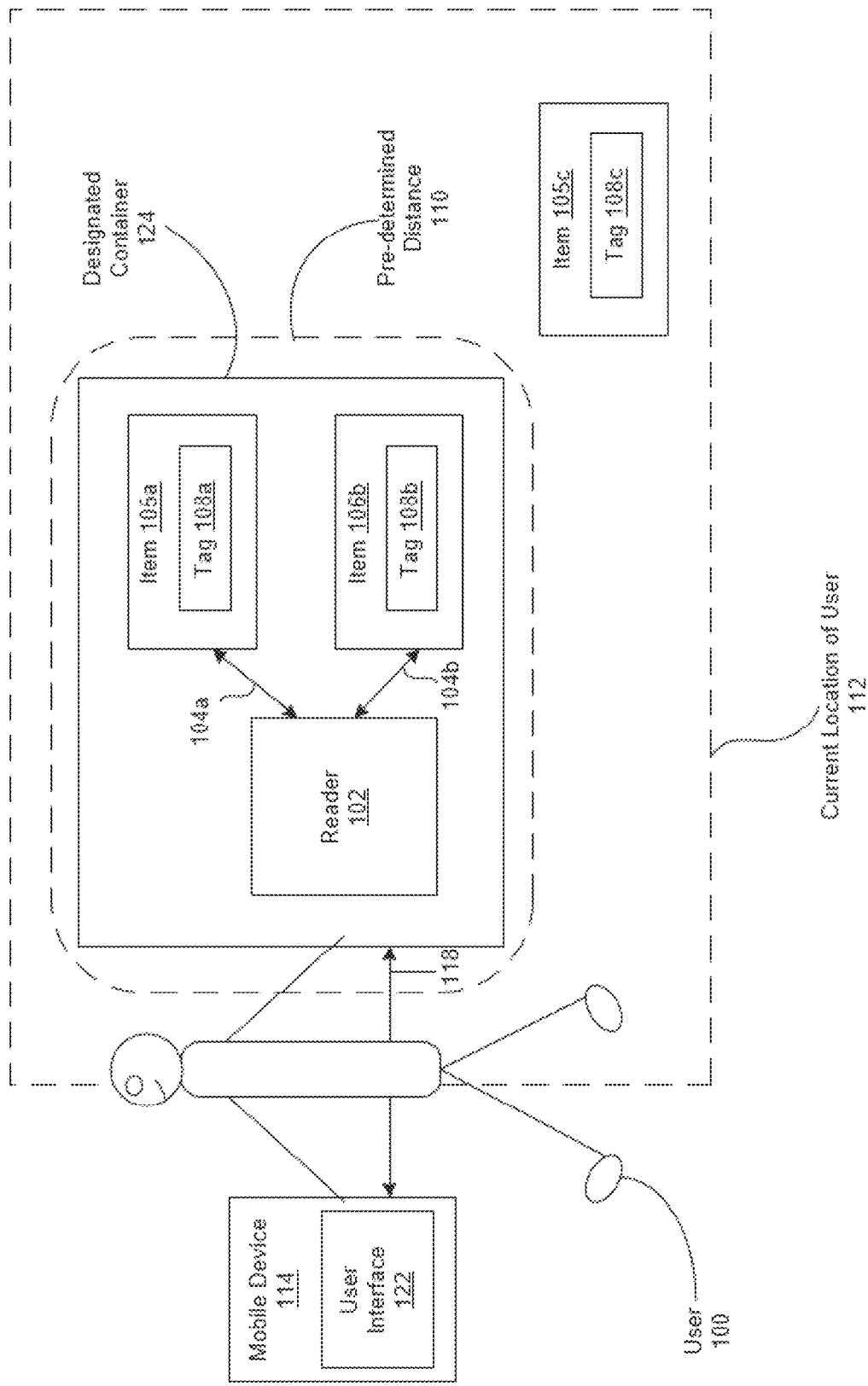
FIG. 1 depicts a representative scenario of a user leaving a current location and being notified on the user's mobile device of a reader not detecting a tagged item, according to an embodiment.

FIG. 1 depicts a representative scenario, according to an embodiment. In a non-limiting example, a user 100 is leaving his/her current location 112 and being notified on the user's mobile device 114 that a reader 102 did not detect a tag 108c, attached to item 106c. The reader 102 uses short-range communication technology, explained in more details below, to detect 104a a tag 108a, attached to item 106a, and to detect 104b a tag 108b, attached to item 106b, which are within a predetermined distance 110 of the reader 102. The reader 102 is placed within a designated container 124 that contains item 106a and item 106b. The reader 102 reports the result of the scan through a short-range communication technology connection 118, also explained in more details below, with the mobile device 114. The system has previously stored the unique identifiers of the tags placed on the user's items (herein referred to, respectively, as a tag 108 and registered item 106) and can determine that one such tag and item—tag 108c, attached to item 106c,—was not detected. The system then notifies the user 100 of the missing item through a user interface 122 on the mobile device 114.

Using a Tracking System

Figure 2:
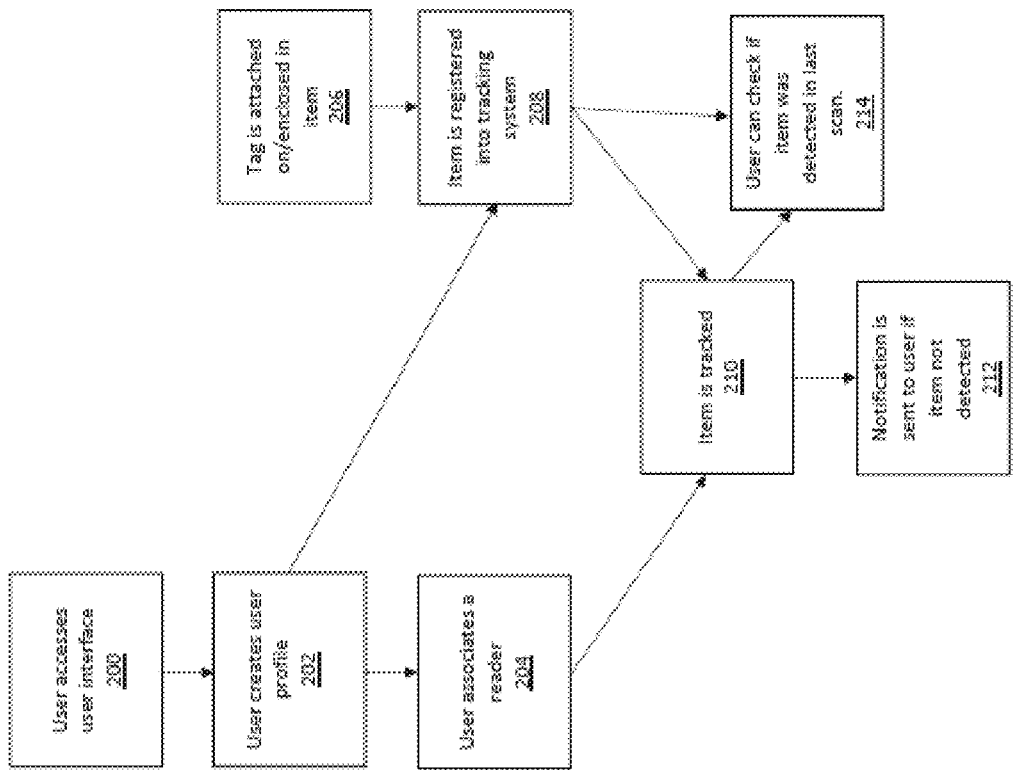
FIG. 2 is a flowchart of functioning of a tracking system, according to one embodiment.

FIG. 2 is a flowchart of functioning of a tracking system, according to one embodiment. In the depicted embodiment, a user accesses a user interface 200 of a tracking system to send and receive information to and from the different components of the tracking system. The user interface is provided on a mobile device. The user interface can be, but is not limited to, a graphical user interface, a voice user interface or both. The user interface can be provided in the form of an app, a gadget or another functionality that the mobile device and/or its operating system support.

A user utilizes a user interface to create a user profile 202 in a tracking system. The tracking system maintains a separate profile for each user of the tracking system.

Once a user profile is created, a user utilizes a user interface on a mobile device to associate a reader 204 with the user profile. The association is done through a short-range wireless communication technology that the mobile device and the reader use to communicate. A user profile can have multiple readers associated with it.

Items for the possession of which a user wants to check must have tags attached to or enclosed in them 206. Such tagged items can be any physical item such as keys, wallets, glasses, passports or IDs, documents, makeup, clothing, professional or recreational instruments such as cameras, lenses, film, power tools, and anything else that the user may have at the user's current location and may need after the user leaves the user's current location.

A user utilizes a user interface to register tagged items into a tracking system 208 under the user's user profile.

A registered item is then tracked (step 210) by a tracking system by taking into account reader motion and conditions for active tracking of the registered item. The registered item is associated with conditions under which the user would want to be notified if a reader did not detect the registered item, e.g., conditions when a registered item should be actively tracked by a tracking system. Such conditions may be provided or later changed, by the user, and the tracking system can leverage other data such as location information, weather status, and calendar events that it is granted access to. It is also possible to use machine-learning techniques to automatically associate conditions with registered items or to propose conditions to the user before doing so.

If a registered item that is being actively tracked is not detected by a reader, associated with the user profile with which the item is registered, when the reader is in motion, the system notifies the user (step 212) through the user interface of the missing item. Additionally, a user can check 214 at any point in time if a registered item was detected in the most recent scan.

A Reader

Figure 3A:
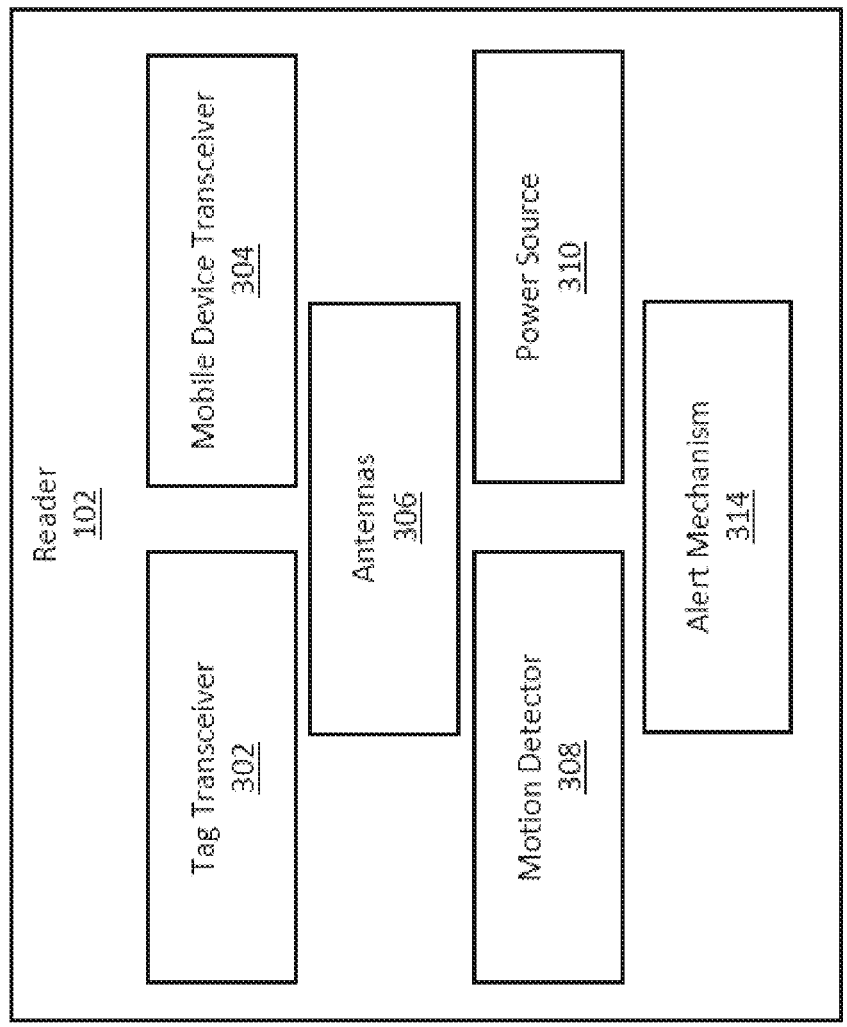
FIG. 3A depicts a reader to be used in a tracking system, according to one embodiment.

FIG. 3A depicts a non-limiting example of a reader (e.g., reader 102) to be used in a tracking system, according to one embodiment. A reader 102 is a device, which comprises a tag transceiver 302 that transmits and receives information to and from tags, a mobile device transceiver 304 that transmits and receives information to and from mobile devices, antenna or antennas 306 for each transceiver, a motion detector 308, a power source 310, and an alert mechanism 314.

A tag transceiver 302 is able to detect tags within a predetermined distance (also referred to herein as a range or a range from the reader), which in different embodiments is set to account for the expected distance between the reader placed or embedded in a designated container and the tagged items placed in that designated container. For example, a reader's range is set by the manufacturer or selected by the user, as described below, to account for the size of a designated container expected to contain the tagged items. In some embodiments, the predetermined distance/range may be related to (e.g., determined based upon) the magnetic field of the reader. A tag transceiver 302 that communicates with tags can be, for example, a transceiver that uses radio frequency identification (herein, "RFID") to scan and identify which tags are in the reader's proximity. In another example, a tag transceiver could use Bluetooth technology/Bluetooth Low Energy (herein, "BLE") to communicate with and identify the presence of tags within a larger range. Different technologies allow for different ranges, as explained further below.

A mobile device transceiver 304 that communicates with mobile devices can be, for example, a Bluetooth transceiver that uses Bluetooth technology or BLE to transfer data between the reader and a mobile device.

RFID is a technology that uses radio waves to transfer data for identifying objects. In an example configuration, an RFID system uses a unique serial number associated with an object and electronically written onto a tag, attached to that object, as its unique identifier. Radio waves are emitted from the tag, described in more detail below, which the reader can receive and turn into digital data containing the tag's unique identifier. Thus, an RFID reader can identify the associated object. RFID readers and tags operate in many frequency bands but the most widely used are around 125 KHz (also referred to as low frequency), around 13.56 MHZ (also referred to as high frequency), around 433 MHz and 860 to 928 MHz (also referred to as ultra-high frequency), and around 2.45 to 5.8 GHz (also referred to as microwaves). Different standards for RFID frequencies and applications have been developed, such as ISO 18000 series, ISO 15693, ISO 14443, ISO 11784, ISO 11785, and others.

Bluetooth (originally IEEE standard 802.15.1) is a communications protocol primarily designed for close-range wireless communication, characterized by transceiver microchips in each of two communicating objects (for example, in a reader and in a mobile device, or in a reader and in a tag attached to or embedded in an item). Bluetooth operates in the 2.400 to 2.485 GHz frequency band and, depending mostly on the power of the transmitter, Bluetooth devices can communicate in a range of 3 feet to 330 feet. BLE is a shorter-range, low power consumption version of Bluetooth appropriate for devices that need to communicate small amounts of data infrequently.

Other configurations of short-range wireless communication technology are possible, such as, but not limited to, transceivers using short-range wireless communication technologies other than RFID, Bluetooth, and BLE (such as, for example, ZigBee, and software-defined radios), or a transceiver being one physical component using many short-range wireless communication technologies to communicate both with tags and mobile devices.

The antenna or antennas 306 coupled to each transceiver can be external to or embedded in such transceiver.

A motion detector 308 is provided as a way to screen out unnecessary checks for possession. Since the system checks for possession of items in order to provide a notification to a user that the user is not in possession of an item that is being actively tracked at a moment when the user is leaving the user's current location, a reader does not need to scan for tagged items at times when the reader is not moving. When the reader is not moving, even if it were to scan and not detect an item, it can be presumed that the user is not yet leaving the user's current location (since the reader is placed in or embedded in a designated container without which the user is unlikely to leave the user's current location). This helps prevent unnecessary notifications to the user for missing items. Additionally, since a reader performs a scan only after continuous motion is detected, as explained further below, such use of a motion detector to prevent unnecessary checks for possessions lowers the power consumption of the reader through fewer energy-consuming events (such as scans, switching from active to inactive/sleep state), allowing longer periods of use between charging or changing the battery. A motion detector can include, for example, an accelerometer, a gyroscope, a magnetometer, as well as a GPS receiver to establish movement between locations, or some combination of these.

A reader is provided with a power source 310. The power source can be any form such as, for example, a slot for batteries that can be changed, for example by the user, or a battery that can be recharged through a USB port or a standard A/C plug. Hardware components required for recharging can be provided as necessary.

A reader is also provided with an alert mechanism 314. The alert mechanism provides indications to a user of numerous types of events. Such events may include, but are not limited to, a reader's not being able to establish a connection to a mobile device, an unassociated reader establishing a connection with a mobile device for association, a need to change/recharge a battery, or when one or more actively tracked item or items is not detected. The alert mechanism can be a speaker, a vibrating motor, a light, a screen or display or any other form suitable to alert a user of an event.

A reader is also provided with the necessary hardware, firmware and/or software to connect and manage the components of the reader described above and to store, access and remove any necessary data, such as a unique identifier of the reader and information for associating the reader with a specific user profile. These components can include, for example, a microprocessor unit, memory, a storage device, a real-time clock, components for battery power measurement, a PC board, discrete electronic components, a static frequency tuner, and a control for basic functions (such as start up, sleep mode, and shut down). An automatic frequency tuner may be added to correct distortions in the radio frequency field, created by disturbances in the magnetic field, such as metal objects. The automatic frequency tuner can optimize the transmission/receive power of the reader for any shape of the reader. As the shape of the reader changes, the automatic frequency tuner adjusts for optimization of that particular shape. An amplifier could also be added to extend the range of the radio frequency field.

In one embodiment, a reader's components can be contained in a standalone casing that would allow a user to attach or place a reader in items such as a bag, a jacket, a car or any other item that can accompany the user when the user moves from one location to another. Readers can be made in different sizes. In another embodiment, the reader's components can be embedded in another item such as, but not limited to, the fabric of a bag, the lining of a jacket, the glove compartment of a car or in any other item that can accompany the user when the user moves from one location to another. When a reader is enclosed in a casing as a standalone device, the casing provides access to any interface elements of an alert mechanism and a power source that allows changing or charging a battery. When a reader is embedded in another item, such as a bag or a jacket, such access is provided, for example, at or through the surface of the material enclosing the reader.

Figure 3B:
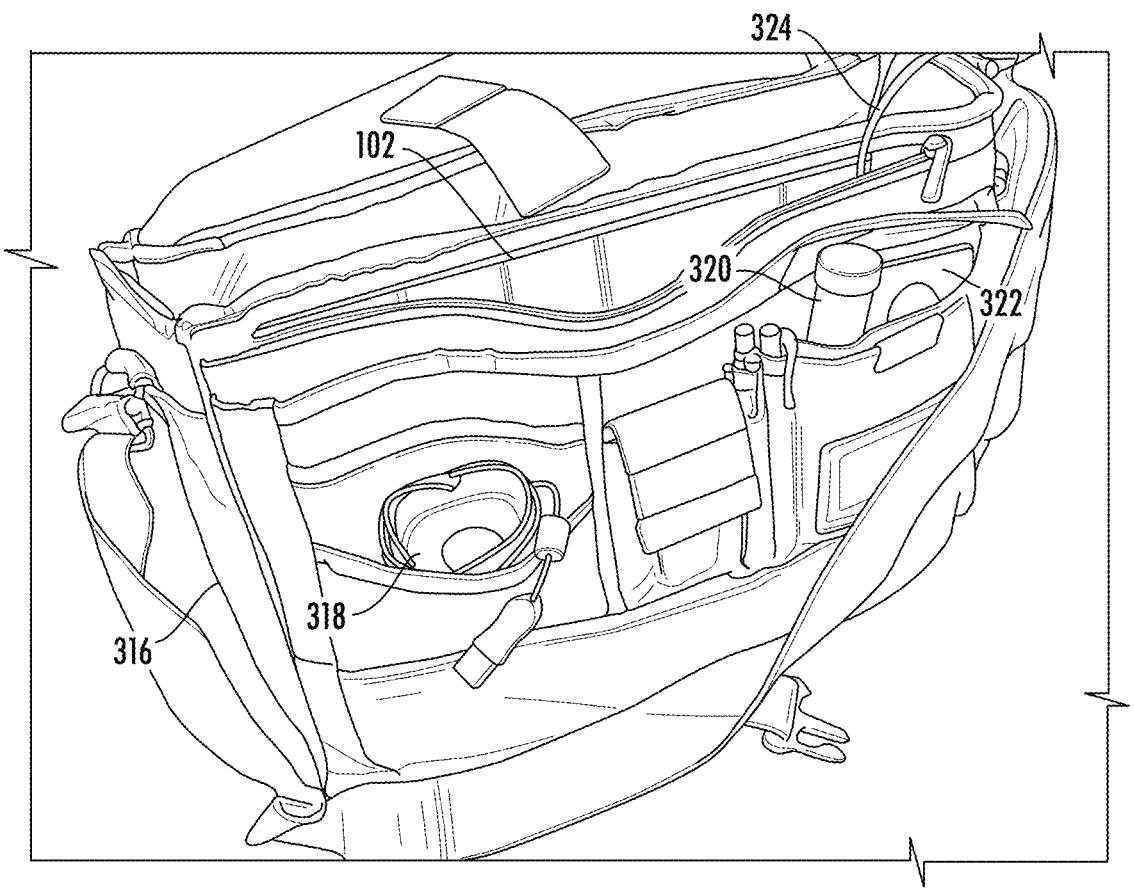
FIG. 3B depicts a placement of a reader in a bag, according to one embodiment.

In one configuration, a reader is provided as a thin, bag-sized sheet, containing an antenna and electrical components, which can be embedded in a surface of a bag or can be placed in the bag. The reader uses high frequency radio frequencies to communicate with the tags. Referring now to FIG. 3B, a non-limiting example of placement of a reader is illustrated, according to one embodiment. In one example, depicted in FIG. 3B, a reader 102 is placed inside a bag 316. Since the reader's range is configured to account for the width of the bag, it would be able to detect a tagged computer mouse 318, a tagged medicine bottle 320, and a tagged wallet 322. The placement of these tagged items in the side pockets of the bag is for easier visualization, but tagged items could also be placed, and detected, in the larger space of the bag on the other side of the reader. The photograph depicts an example situation where the reader is being charged without being taken out of the bag, through a USB cable 324 plugged into a hardware component for recharging at the side edge of the reader. Similarly, to how the reader can fit into a thin pocket of the bag, as depicted in the photograph in FIG. 3B, in another embodiment a reader could be embedded in a side surface of a bag, as described above.

In another configuration, a reader is designed as two flat sheets, joining at one edge perpendicularly or at an angle that varies between 60 and 130 degrees. Each flat sheet contains an antenna so that the antennas are also perpendicular to each other or at an angle that varies between and 130 degrees (with one of the sheets containing the electrical components connected to both antennas). The reader can also be designed as one flat sheet containing the electrical components and one antenna that is folded perpendicularly or at an angle that varies between 60 and 130 degrees. The reader uses high frequency or ultra-high frequency radio frequencies to communicate with the tags. This design can increase the number of directions of the radio frequency waves emitted by the reader, which improves tag detection in the presence of any metal surfaces that may interfere with either one of the antennas. This design, combined with a frequency tuner that resets the field when potentially interfering items enter the field, forms a configuration that allows for most reliable readings at the desired range. The reader can be placed or embedded, for example, in a bag.

In another configuration, a reader is designed to be placed or embedded in a bag as two sheets, joining at one edge at an angle that allows the sheets to align with, for example, the bottom and a side surface of the bag or two side surfaces. Each sheet contains an antenna so that the antennas are also at an angle that allows the antennas to align with, for example, the bottom and a side surface of the bag or two side surfaces (with one of the sheets containing the electrical components connected to both antennas). The reader can also be designed as one sheet containing the electrical components and one antenna that are folded at an angle that allows the antenna to align with, for example, the bottom and a side surface of the bag or two side surfaces. The reader uses high frequency or ultra-high frequency radio frequencies to communicate with the tags. This design can increase the number of directions of the radio frequency waves emitted by the reader, which improves tag detection in the presence of any metal surfaces that may interfere with either one of the antennas. This design, combined with a frequency tuner that resets the field when potentially interfering items enter the field, forms a configuration that allows for most reliable readings at the desired range.

In yet another configuration, a reader is embedded in a bag in a manner where an antenna is embedded in each of two or more side surfaces of the bag at any angle or one continuous antenna is embedded in two or more side surfaces of the bag at any angle. The electrical components of the reader are also embedded in a side surface of the bag and connected to the antenna or antennas. The reader uses high frequency or ultra-high frequency radio frequencies to communicate with the tags. This design can increase the number of directions of the radio frequency waves emitted by the reader, which improves tag detection in the presence of any metal surfaces that may interfere with either one of the antennas. This design, combined with a frequency tuner that resets the field when potentially interfering items enter the field, forms a configuration that allows for most reliable readings at the desired range.

A Tag

Figure 4A:
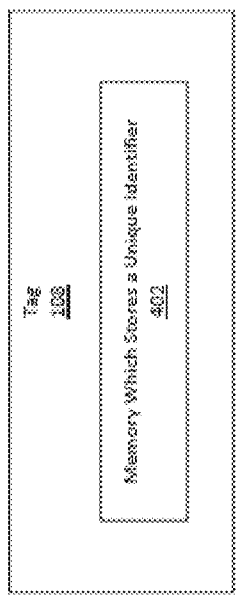
FIG. 4A depicts a tag to be used in a tracking system, according to one embodiment.

FIG. 4A depicts a tag to be used in a tracking system, according to one embodiment. A tag 108 used in the system contains a memory unit which stores a unique identifier 402 of the tag. The unique identifier can be read by a reader. The tag stores information and communicates with a reader 102 through, for example, an integrated circuit with logic and memory, and an antenna. The tag can be either passive or active. A tag would use a technology that corresponds to the technology used by a reader to communicate its unique identifier to the reader.

In one example, an RFID passive tag can be used in the system, communicating at the same frequency as the reader, such as high frequency or ultra-high frequency. A passive tag does not have its own power source; instead, the electromagnetic waves sent by a reader induce a current in the reader's antenna that is then used to power the integrated circuit and emit back radio waves that can be received and turned into digital data by the reader. In another example, an active RFID tag has its own power source to activate the radio wave emission, which can extend the signal range and increase read reliability. Low frequency tags can be read from a range of a few inches and can be used near objects containing liquid or metal, but more than one such tags are difficult to read at the same time given the short read distance. High frequency tags can be read within a range of a few feet, allow multiple tags to be read at the same time and permit little interference by liquid- or metal-containing objects. Ultra-high frequency allows for a larger reading range (of up to 20 feet), but a tag may not be properly read if liquid or metal is placed between the reader's antenna and the tag. Due to innovations in the field, such as inkjet printing with conductive inks and the spread of RFID systems in industrial and commercial applications, RFID tags are becoming less expensive to manufacture and can be thin and small in size, making them suitable for use on smaller personal objects to be tracked. In another example, a tag may use a Bluetooth transceiver microchip to communicate with a reader.

Figure 4B:
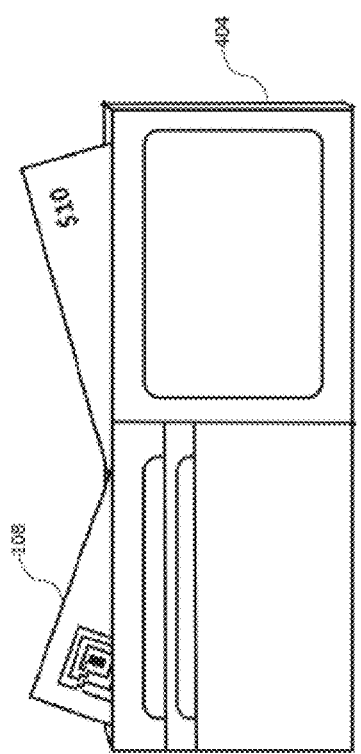
FIG. 4B depicts a scenario of a tag being enclosed in another item, according to one embodiment.
Figure 4C:
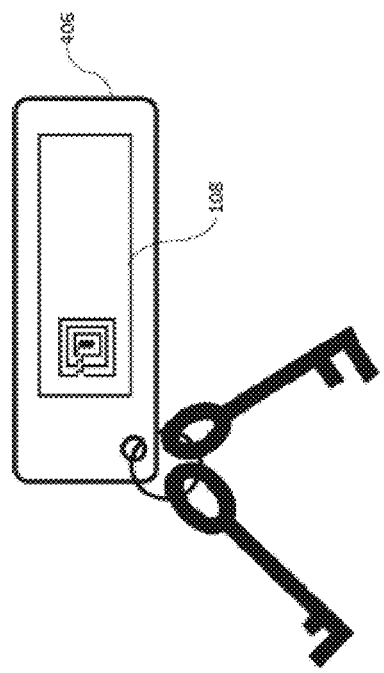
FIG. 4C depicts a representative scenario of a tag being attached to another item, according to one embodiment.

A tag can be attached to or enclosed in an item at any time, for example by the user after separately obtaining tags and items the user wants to track, or the tag can be attached to or enclosed in an item during manufacturing or post-manufacturing processing so that the user obtains the item the user wants to track with the tag already attached to or enclosed in it. A tag can be fully attached to an item, for example through an adhesive surface on one side of the tag that is placed on the item as a sticker. A tag can also be attached through an attachment mechanism, such as a keychain. In one example, passive RFID tags, with a unique identifier written permanently onto the tag during the manufacturing of the tag, are attached to items using an adhesive surface of the tag. FIG. 4B depicts a scenario of a tag being enclosed in another item, according to an embodiment. In this non-limiting example, tag 108 is enclosed in another item 404. FIG. 4C depicts a representative scenario of a tag 108 being attached to another item 406, according to one embodiment.

A Mobile Device

Figure 5:
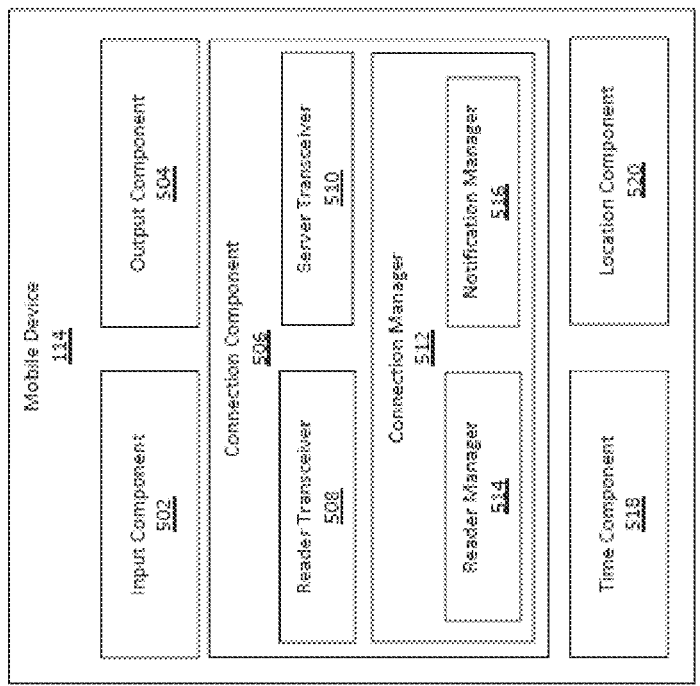
FIG. 5 depicts a mobile device to be used in a tracking system, according to one embodiment.

FIG. 5 depicts a mobile device to be used in a tracking system, according to one embodiment. In a non-limiting example, as depicted in FIG. 5, a mobile device 114 to be used in a tracking system, according to one embodiment. A mobile device 114 comprises an input component 502, an output component 504, a connection component 506, a connection manager 512, a time component 518 and a location component 520.

An input component 502 comprises the hardware, firmware and/or software to allow a user to input information into a tracking system through a mobile device. In different configurations, the input component could be, for example, a physical keyboard, a digital keyboard, a touch screen for accepting commands through buttons, icons and menus, a camera, a microphone, or a combination of all or some of these.

An output component 504 comprises the hardware, firmware and/or software to allow a user to perceive information from a tracking system through a mobile device. In different configurations, the output component could be, for example, a graphical display, a speaker, a vibration-inducing motor, or a combination of all or some of these.

A connection component 506 comprises the hardware, firmware and/or software to allow a mobile device to communicate with a reader (a reader transceiver 508) and with other components of a tracking system, stored for example on a remote server (a server transceiver 510). In one configuration, the connection component can include a Bluetooth chip to connect to a reader and an antenna to connect to a remote server that hosts other components of a tracking system through the data connection of a mobile phone or through a Wi-Fi connection. As disclosed herein, all functionality of different modules within the mobile device 114 may be controlled by an application installed onto the mobile device 114 and in communication with a back-end server, such as the server transceiver 510.

A connection component 506 includes a connection manager 512 which comprises the hardware, firmware and/or software to allow the connection component to respond to requests from other components of a tracking system for a mobile device to send or receive information from a reader, and to send information to the other components of the tracking system (a reader manager 514). The connection manager also generates notifications to the user when a mobile device cannot communicate with a reader or when the user needs to be alerted by the tracking system (a notification manager 516).

A time component 518 comprises the hardware, firmware and/or software to allow a mobile device to determine time and provide it to the other components of a tracking system. In one example, the time component is a standard clock function of a smartphone.

A location component 520 comprises the hardware, firmware and/or software to allow a mobile device to determine the geographic location of a mobile device and provide it to a tracking system. In one example, the location component is a GPS receiver, which could be supplemented or replaced by a GPS receiver in the reader.

In one example, a mobile device is a smartphone, on which a user downloads and interacts with an item reminder application that provides a user interface for the user to use a tracking system. The user associates one or more readers to a user's profile and is able to register items to be tracked. The smartphone connects to a reader with a Bluetooth chip and to a server that hosts the other components of the tracking system through the cellular network of a mobile carrier or via Wi-Fi. The smartphone has a clock and a GPS receiver that provide data to the tracking system for the tracking system to determine when it is necessary to begin actively tracking certain registered items. The tracking system is able to notify the user of a missing item by displaying a message on the smartphone screen that can be accompanied by a sound alarm or a vibration.

Those skilled in the art would recognize that the components described serve only as an example, and the functionalities of these components may be obtained with fewer or more components. A mobile device described above generally includes the necessary power sources, processors, memory, and storage devices required to perform the described functions. Whenever a component described above contains software, this would be, for example, computer code, stored on a mobile device, which, when executed by a processor, causes the mobile device to perform the functions described above.

Other Components of the Tracking System

Figure 6:
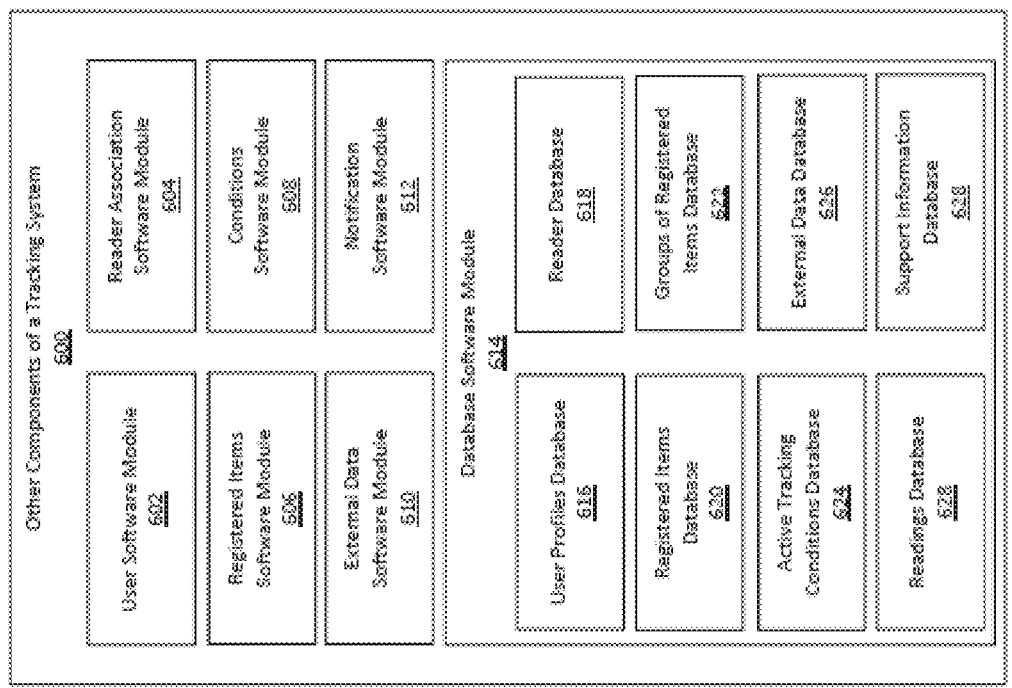
FIG. 6 depicts other components of a tracking system, according to one embodiment.

FIG. 6 depicts other components of a tracking system, according to one embodiment. In the non-limiting example depicted in FIG. 6, components of a tracking system 600 are illustrated.

A tracking system may be supported by databases and software modules that receive, process, and send information. Databases, software modules, and information can be stored and operated on a mobile device, on a server, or both. A software module is, for example, computer code, stored in a non-transitory computer-readable medium, such as the storage device of a mobile device or on a remote server, which, when executed by a processor, causes the tracking system to perform the functions described next. A user software module 602 manages the creation and maintenance of user profiles. A reader association software module 604 manages the association and de-association of readers and the creation and maintenance of lists of readers, associated with user profiles. A registered items software module 606 manages the creation and maintenance of entries for registered items and groups of registered items to be tracked together, associated with user profiles. A conditions software module 608 manages the creation and maintenance of conditions associated with registered items or groups of registered items to be tracked together, which trigger the active tracking of these items. An external data software module 610 manages communications with external data sources necessary to check when conditions are true, such as, for example, an external clock, an electronic calendar, a weather application. A notification software module 612 prompts and processes information sent to or reported from a reader, cross-references it with registered items or groups of registered items that are being actively tracked, and causes a notification, and more information related to the notification, to be displayed to a user if required. Information can be stored in databases such as a user profiles database 616, reader database 618, registered items database 620 with information about registered items (such as unique identifiers of tags and other user input information related to the registered item), groups of registered items database 622, active tracking conditions database 624, external data database 626, readings database 628 with time-stamped reader scanning data, and other support information database 630. Other support information may include, for example, the steps taken by a user after the user receives a notification for a missing item (e.g. changing the condition for active tracking of a certain registered item) which can then be used by the conditions software module of the tracking system to automatically set, or propose to the user, new conditions for active tracking of certain registered items through a machine learning algorithm. Another example of other support information is QR codes of tags and the respective unique identifiers of the tags, the use of which is further described below. A database software module 614 is provided to handle information requests and transfers from and to other software modules and the databases.

Those skilled in the art would recognize that the software modules and databases described serve only as an example, the functionalities of these modules may be obtained with fewer or more modules, and the information in these databases can be arranged in fewer or more databases. Those skilled in the art would also recognize that applying measures for protection against unauthorized access to the software modules and databases, while not specifically described here, would not depart from the scope of the invention.

Process of Creating a User Profile

A user creates a user profile using a user interface. In one configuration, the user interface is provided in the form of an item reminder application on a mobile device of the user. The user interface allows the user to choose a unique identification, such as a username (which could also be an e-mail address) and password, which is then stored in a user profile database by a user software module of the tracking system. The user profile is then ready for readers, registered items, and conditions to be managed via the user profile.

Figure 7:
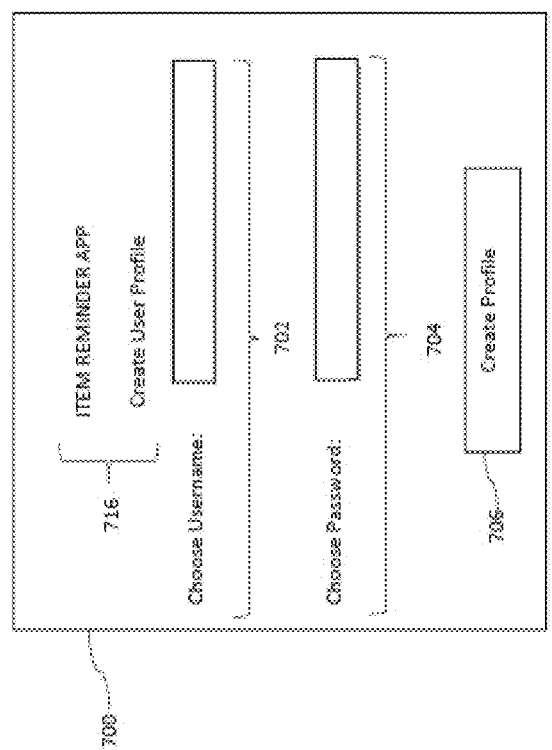
FIG. 7 depicts a user interface for initiating the creation of a user profile to be used in a tracking system, according to one embodiment.

FIG. 7 depicts a user interface for initiating the creation of a user profile to be used in a tracking system, according to one embodiment. In the non-limiting example depicted in FIG. 7, a screen 700, displayed on a user interface 122, contains the portion of an item reminder application for creating a user profile 716 where a user 100 is provided with a text box to choose a username 702 and another textbox to choose a password 704, after which the user can instruct the system to create a user profile by pressing a Create Profile button 706.

Process for Associating a New Reader to a User Profile

Figure 8:
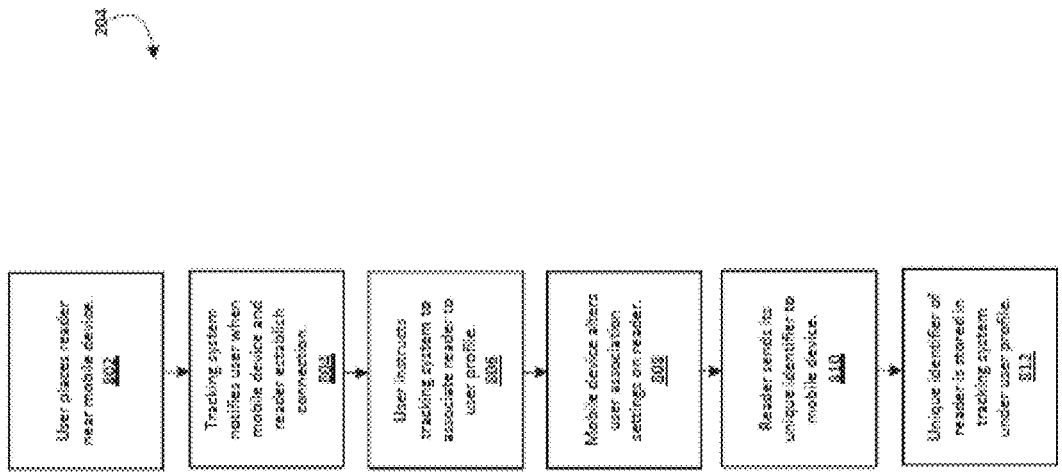
FIG. 8 is a flowchart of a process of associating a new reader to a user profile to be used in a tracking system, according to one embodiment.

FIG. 8 is a flowchart of an example process of associating a new reader to a user profile to be used in a tracking system, according to one embodiment. When a user wants to use a reader to track the user's items, the user associates a reader with the user's profile 204. In an example process for associating a new reader 204, the reader is placed within a distance of a mobile device of the user that allows the reader and the mobile device to communicate 802. The system notifies the user when it has detected the presence of a reader. The system can notify the user that the reader and the mobile device have established a connection 804 by, for example, displaying a notification in the user interface or causing the reader to emit or display a light/sound/vibration alert. The user then uses the user interface to instruct 806 the system to associate the reader to the user profile. The association is done through the mobile device's writing or changing user association settings 808 and the reader's sending 810 its unique identifier to the mobile device. Once the user association is set on the reader and the unique identifier is stored 812 in the system under the user profile, the reader is associated with the user profile. Security measures to prevent unauthorized de-association are taken, such as requiring a de-association instruction and confirmation to be provided from the associated user profile through the user interface. The user profile can be associated with multiple readers at the same time. In certain embodiments, a user can give permissions to others to utilize a reader that is associated with their user profile, and/or share registered item data.

Process for Registering Items to be Tracked

Figure 9A:
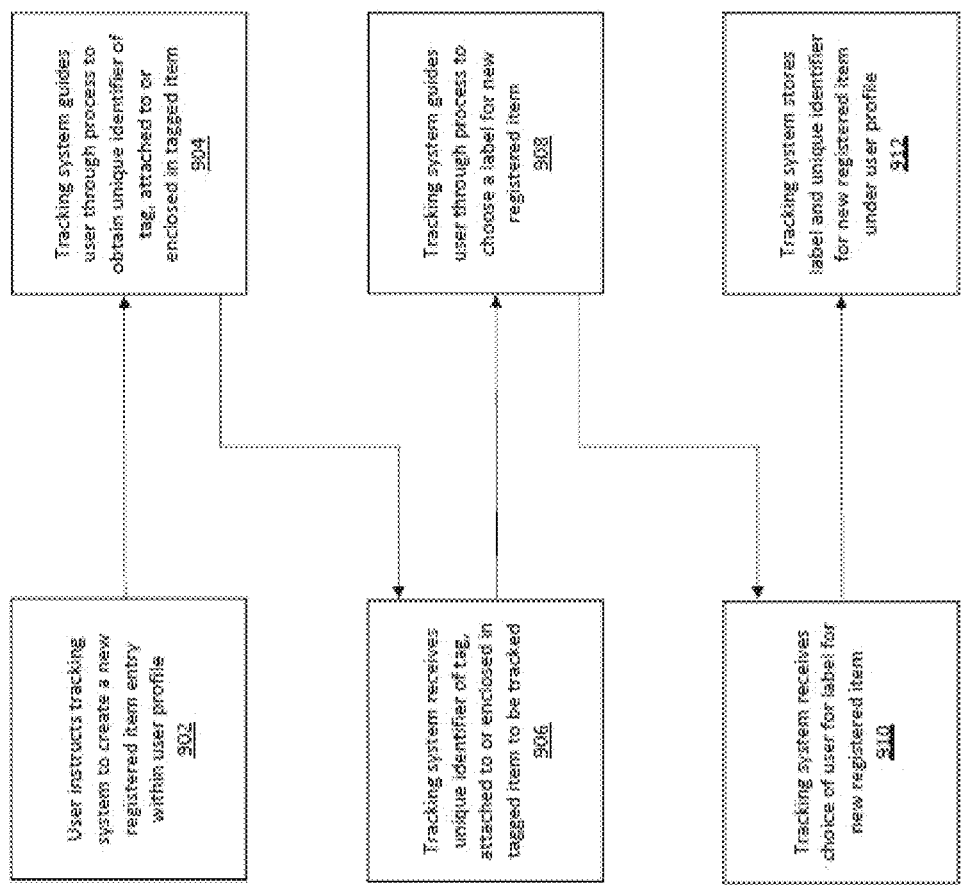
FIG. 9A is a flowchart of a process of registering an item to be tracked under a user profile to be used in a tracking system, according to one embodiment.

FIG. 9A is a flowchart of a process of registering an item to be tracked under a user profile to be used in a tracking system, according to one embodiment. When a user wants to track an item, the user registers the item to a tracking system 208. The item has to have a tag attached thereon or enclosed therein. The user will then have to use the user interface on the user's mobile device to instruct 902 the tracking system to create a new registered item entry within a user profile. In one configuration, once the user has instructed the tracking system that the user wants to register a new item, the tracking system will then guide the user through the process of obtaining the tag's unique identifier 904, and, once the unique identifier is received 906 by the tracking system, through a process of choosing a label for the item 908; once the choice of label is received 910 by the tracking system, the system will record 912 both unique identifier and label under the user profile to complete the process. The tracking system can obtain the tag's unique identifier using a number of methods such as optical, RF, or web-based methods.

Figure 9B:
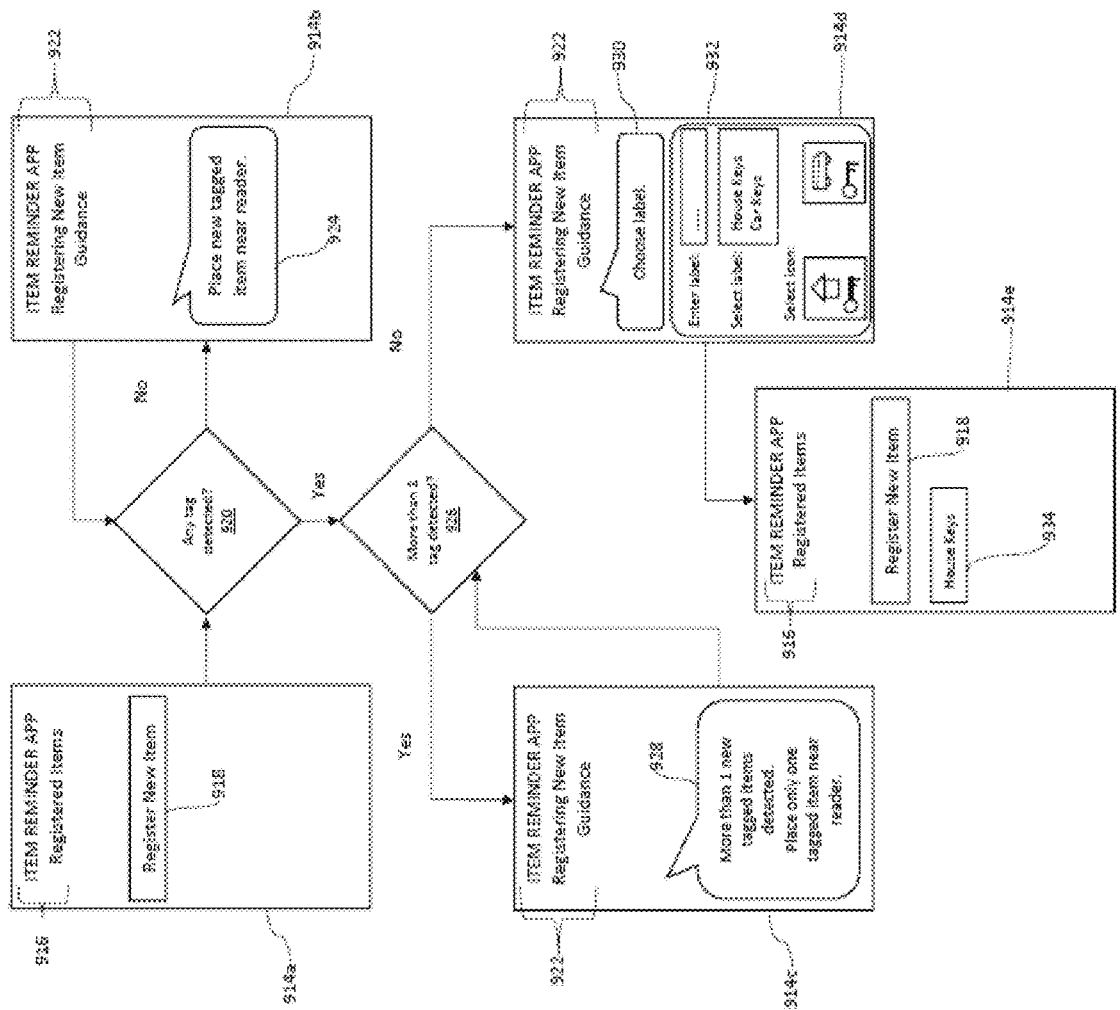
FIG. 9B is a flowchart of a user interface of a registration of an item to be tracked to be used in a tracking system, according to one embodiment.

FIG. 9B is a flowchart of a user interface of an example registration of an item to be tracked to be used in a tracking system, according to one embodiment. It depicts a series of screens (collectively, referred to as registration screens 914) of an item reminder app. In a first screen 914a, in a Registered Items portion of the item reminder application 916, a user can begin the registration process by pressing a Register New Item button 918. The user interface will display in screen 914b, containing the Registering New Item Guidance portion of the item reminder application 922, an instruction 924 for the user to place the tagged item near the reader (if, for example, the reader does not detect 920 the tag immediately). Once the reader has detected the new item through its tag and has received 906 the tag's unique identifier, the system will prompt the user to choose a label for the item, either from a pre-arranged list of labels or by entering a label of the user's choice. A label could be any word or words that the user can identify the item with, such as for example "keys," "house keys," "car keys," "car keys— original set," "car keys—copy." A label could also be in the form of a drawing or photograph of an item, for example a drawing of keys, keys and a house, keys and a car, presented to the user in the form of icons to choose from. The user can enter the label by typing or saying the words of the user's choice, or by clicking on a word or icon from a list of words or icons, presented to the user. The level of granularity of labeling depends on the preferences of the person supplying the pre-arranged list of labels to the system or to the user entering such labels. The pre-arranged list can be supplied, for example, by the developer of the item reminder app. The pre-arranged list of labels can further be populated with labels that are provided by a provider of items from whom the user obtains the item. For example, a user may purchase an item that has a pre-installed tag from an online store. Through the appropriate APIs, the tracking system would obtain a description of the item and the unique identifier of the tag attached to or enclosed in the item and would store them under the user profile. Later, once the user has received the item, when the reader detects the unique identifier of the tag, which is already stored in the tracking system, the system can automatically suggest a label for the newly registered item based on the description it has obtained from the online store. The tracking system can display a screen 914d, containing a prompt 930 to the user to choose a label for the detected tagged item. The tracking system can contain a selection 932 of options for the user to manually enter a label, or select a label from an existing list of words or icons. Once the user has chosen the label for the new item, the system associates the tag's unique identifier and the label, stores them in a list of registered items under the user profile and is ready to track the item. The tracking system can, for example, display a screen 914e, returning the user to the Registered Items portion of the item reminder application 916 which now contains a button 934 representing a label for the registered item. If the reader detects more than one unregistered tagged items 926, the system would then display a prompt 928 to the user to place all but one of the more than one unregistered tagged items away from the reader, as depicted in screen 914c. Once the reader is detecting only one unregistered tagged item, the system will continue to prompt the user to choose a label for the item as described above.

FIG. 9C is a flowchart of a user interface of an example registration of an item to be tracked to be used in a tracking system, according to one embodiment. After pressing a Register New Item button 918, a user interface would display an instruction 936 for the user to scan a QR code, printed on the tag, using the mobile device, as shown in screen 914f. Once the mobile device has scanned the QR code, it transmits it to the system. The system then compares the QR code to a database of unique identifiers of tags and the respective QR codes printed on such tags and finds 938 the unique identifier of the tag whose QR code the user has scanned. Once the system has the unique identifier of the tag, the system will prompt the user to choose a label for the item and then associate and store the unique identifier and label as described above. This guidance does not require the unregistered tagged item to be near the reader.

The Process of Tracking

Registered items can be tracked individually. A group of registered items can be tracked together. A registered item can be tracked individually, and be included in a group at the same time. A registered item can be included in more than one group. For example, a user can register a laptop to the system to be tracked. The user can then include the laptop in a group with registered office keys and a registered office ID, comprising the user's group of work-related items. The user can also include the laptop with registered presentation folders, comprising the user's group of meeting items. The system can then track the laptop individually and/or track the group of work-related items and the group of meeting items.

For each registered item under a user profile, the tracking system maintains a condition of when to actively track that item. A condition is a list of circumstances, such as a time of the day, a day of the week, a date, a business day or holiday, a departure for a planned trip, a business meeting, or others, in any combination thereof. A registered item can be set to be tracked continuously until manual deactivation, just as the tracking conditions for a registered item can be turned off so the item would not be tracked. A condition can also be maintained for a group of tagged items and can be the same or different from the conditions for each registered item in the group. FIG. 10A is a flowchart of a process for checking for possession of an item to be used in a tracking system, according to one embodiment, which begins with a condition for active tracking being associated 1002 with at least one registered item in a user profile.

The system checks for possession by combining 1004 the conditions for actively tracking registered items being true and motion detection on the reader side. The tracking system cross-references 1006 the unique identifiers of tags, detected by a reader in motion with the identifiers of registered items that are being actively tracked, and depending on whether they are identical 1008 concludes the check for possession if they are 1010 or proceeds to notify the user of actively tracked items that were not detected 1012.

FIG. 10B is a flowchart of a process for determining if a condition is true and a reader is in motion to be used in a tracking system, according to one embodiment. In one embodiment, depicted in FIG. 10B, the reader is programmed to scan when its motion detector registers that the reader is in motion. For instance, the reader (or the server communicating with the reader) may determine that a motion attribute satisfies a threshold (e.g., speed and/or distance) threshold. In some embodiments, the reader may also communicate and/or use data received from a secondary sensor, such as a pedometer. For instance, the threshold may correspond to a number of steps taken by a user associated with the reader and/or steps associated with the reader itself. In a non-limiting example, the reader may be placed in a bag and a pedometer (associated with the bag) may transmit the motion attributes (e.g., number of steps associated with the bag).

In this way, the reader/server ensures that the reader is in motion. In some embodiments, the reader may use the above-described motion attributes to identify whether the reader has moved from a still position (e.g., not moving) to a moving position having motions attributes that satisfy a threshold. In a non-limiting example, in order to minimize false positives, the reader may only determine that the reader is in motion when the speed of travel (motion attribute) for the reader is higher than a threshold.

When it is determined that the reader is in motion 1014 (the reader has a motion attribute that satisfies a threshold), the reader, through its RFID chip and associated antenna or antennas, scans 1016 for tags within a predetermined distance, determines the unique identifiers of the tags it detects and sends 1018 the identification results to the mobile device. The system (at step 1024) then proceeds to cross-reference 1006 the tagged items that have been detected with registered items, or groups of registered items, which are marked as actively tracked 1022 at the moment (e.g., whose conditions for active tracking have been determined 1020 to be true). As an example, a user may want to be in possession of a registered item when the user leaves the user's current location between 9 am and 10 am every weekday. Therefore, once that condition is true, e.g., between 9 am and 10 am every morning, the system would mark the item as being actively tracked. Data can be obtained from external sources: for example, the time, day of the week and date can be gathered from the mobile device's clock; a schedule for a planned trip or a business meeting can be gathered from an electronic calendar; a business day or a holiday can be inferred from the settings of a wake-up alarm. If the reader did not detect such an actively tracked item, group of items, or an item included in a group, the system sends 1012 a notification to the user about the missing item. If all actively tracked items or items included in an actively tracked group have been detected, the system does not send 1010 a notification to the user.

Figure 10C:
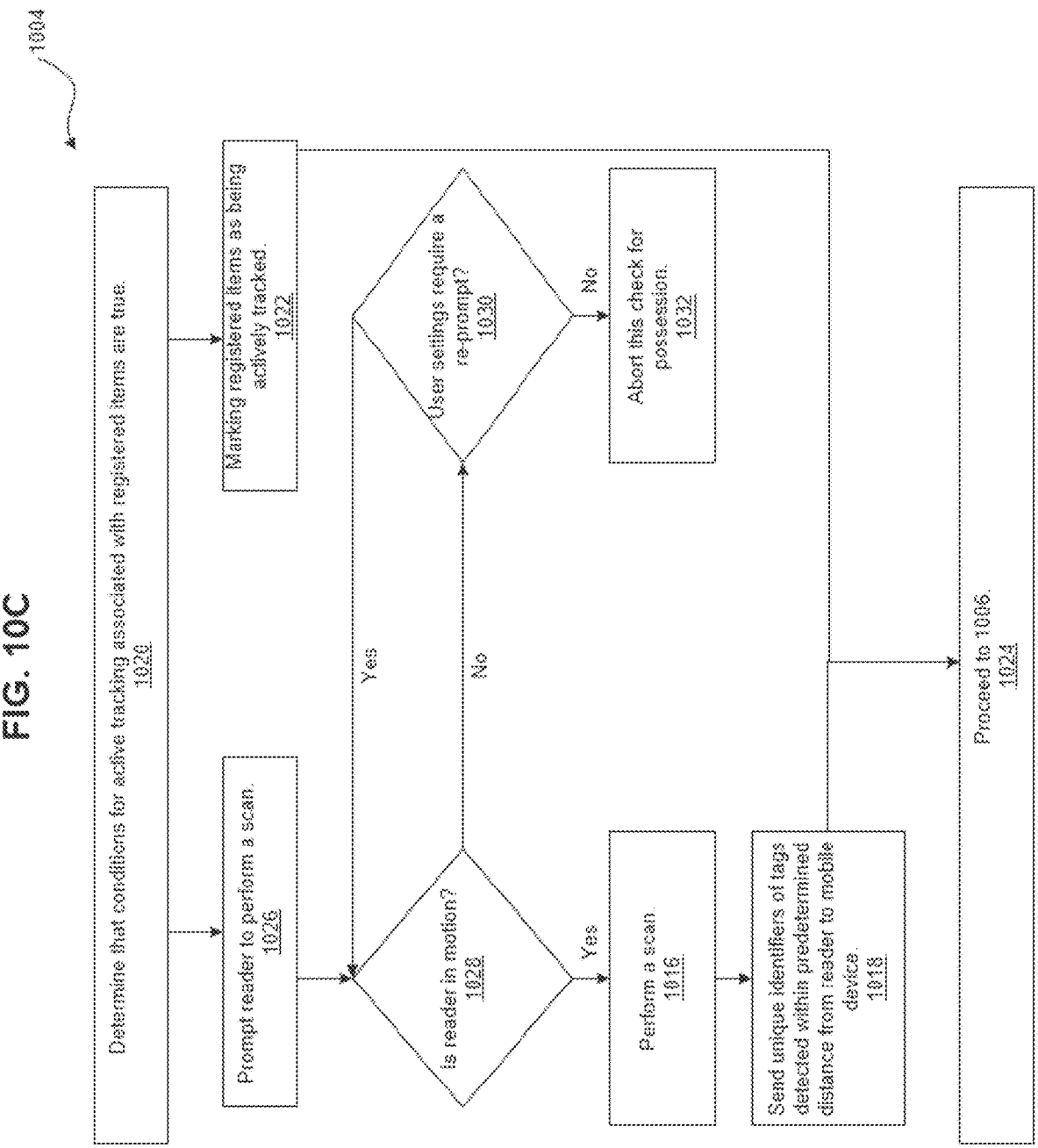
FIG. 10C is a flowchart of a process for determining if a condition is true and a reader is in motion to be used in a tracking system, according to one embodiment.

FIG. 10C is a flowchart of a process for determining if a condition is true and a reader is in motion to be used in a tracking system, according to one embodiment. In the embodiment depicted in FIG. 10C, the performance of a check could take place in different steps:

The system checks for the occurrence of the conditions for active tracking of registered items, as described above.

Once a condition is determined to be true 1020, and registered items are marked as actively tracked 1022, the mobile device prompts 1026 the reader to perform a scan. When the reader receives the prompt, the reader performs a scan 1016 only if the reader is in motion 1028. The reader detects motion through its motion detector. The reader, through its RFID chip and associated antenna or antennas, scans for tags within a predetermined distance, identifies the tags it detects and sends 1018 the identification results to the mobile device. The system (at step 1024) then proceeds to cross-reference 1006 the tagged items that have been detected with the actively tracked items. If the reader did not detect such an actively tracked item, group of items, or an item included in a group, the system sends a notification to the user for the missing item. If all items have been detected, the system does not send a notification to the user. If the reader is not in motion 1028, the check for possession is aborted 1032, or the system can prompt another scan after a certain period of time, if required 1030 for example by the user settings.

As discussed above, various functionalities described herein (e.g., in FIG. 10C or any other part of the present disclosure) can be performed by a back-end server. For instance, various modules described herein (e.g., reader and/or motion detector) may communicate with the back-end server and may receive instructions to perform various functions. For instance, the back-end server may receive an indication from the motion detector that the reader is in motion (e.g., the reader has satisfied a distance threshold). The server may then instruct the reader to scan for the tracking device.

FIG. 10D is a flowchart of a process for determining if a condition is true and a reader is in motion to be used in a tracking system, according to one embodiment. In the embodiment depicted in FIG. 10D, the performance of a check could take place in different steps where certain steps are performed by the reader: The unique identifiers of actively tracked registered items are sent to reader 1034. The information could be sent in a number of ways, such as a list of unique identifiers, or a hash generated by the unique identifiers of the actively tracked items. Such hashes could also contain additional data necessary for tracking such as the day of the week when the user wants the registered items to be actively tracked. When it is determined that the reader is in motion 1014, the reader, through its RFID chip and associated antenna or antennas, scans 1016 for tags within a predetermined distance, determines the unique identifiers of the tags it detects, and cross-references 1038 unique identifiers of tags detected by it within predetermined distance with unique identifiers of actively tracked registered items (e.g., whose conditions for active tracking have been determined 1020 to be true, for example by the information contained in the hashes sent 1034 to the reader and the reader's own real-time clock).

For battery preservation purposes, the scan 1016 may be programmed to be performed only if the reader determines 1036 that it has been still after a previous scan 1016. This would reduce the number of scans in a situation when, for example, the user keeps walking after the reader's initial transition from stillness to motion prompts a scan 1016 at the point when the user leaves the user's location. After cross-referencing 1038, (at step 1040) if the reader did not detect such an actively tracked item, the reader initiates a notification to the user, for example by sending the outcome of the cross-reference to the mobile device or by its own alert mechanism 314. If all items have been detected, the reader does not initiate a notification to the user. As describe above, the reader may determine that the reader is in motion when the reader moves from a still position to a moving position that has a motion attribute that satisfies a threshold. In a non-limiting example, when a reader moves from a still position to a moving position (e.g., a user start walking away from a location), the reader perform the scanning described herein. However, if the user continues walking, the reader may not continuously scan for tracking items because the reader has not moved from a "still position" to a "moving position." Avoiding continuous scanning may also preserve the battery.

It should be understood that process of tracking disclosed above accommodates variations from the examples given above that would still be within the scope of the invention. For example, the system would work with two or more readers associated with a user profile each one independently performing a check for possession based on the same conditions being true and the motion of each reader.

A reader is considered to be in motion whenever its motion detector detects motion, but a threshold duration of the motion or a threshold number of steps taken may be used to assume the reader is in motion for executing a check for possession. In one embodiment, continuous motion is established by first collecting positioning data from an accelerometer at 1-second intervals. Values are then inputted into a least squares calculation with that of the previous reading. If the least squares score is above a certain threshold, it is considered that movement was recorded in that second. This is determined over a predetermined length of time, such as, but not necessarily, 10 seconds. The ratio of the number of movements recorded to the number of measures recorded is calculated. If the ratio is above a certain threshold, it is considered that there is sufficient movement in the period for the reader to proceed with a scan.

Conditions are established for example through user input and can leverage other data that a tracking system is granted access to. In one embodiment, a user can individually assign days of the week, specific dates and specific times when the tracking system should actively track specific items or group(s) of items. In another embodiment, a user can set that specific registered items or group(s) of items are actively tracked beginning a certain amount of time after a morning alarm. In another embodiment, the tracking system can access an electronic calendar and scan for upcoming events. The user can assign, for example, specific words, names of people, locations or topics to specific registered items or group(s) of items and the system can actively track the registered items if the word, names of people, locations or topics appear in the description of an upcoming event. Conditions may also include a requirement that the user is in a specific location when performing a check. It is also possible to use machine-learning techniques to automatically associate conditions with registered items or to propose conditions to the user before doing so.

Predetermined distance denotes that a reader, at the time of scanning, is set to detect tags that are located within some specific distance. In one embodiment, the specific distance is configured when manufacturing a reader. A user would then be able to choose between readers that check within different distances. The user may choose a reader with a very short read distance if the user plans to place the reader in a designated container in which the user expects the reader to be within such short distance of tagged items, for example, a bag that is expected to have a tagged laptop in it. The user may choose a reader that checks within a longer distance if the user expects to place the reader, for example, in the glove compartment of a car where the reader should be able to check for tagged items in the back seat of the car. In yet another embodiment, the reader may be configured during manufacturing to be able to scan within different distances and a user would be able to switch between distances through a physical control on the reader or through the user interface.

When a connection between a reader and a mobile device cannot be established at a moment when the reader is in motion, the reader may be programmed to display or emit a light or sound alert to alert the user.

The Process of Notifying the User

Once a registered item, group of registered items or a registered item included in a group is not detected during a scan, and if the missing item is marked as being actively tracked, the system sends 212 a notification to the user. The notification could be in the form of an audio signal, or visual display, textual and/or graphical, or other sensory notification, such as vibration, that correspond to the capabilities of the mobile device. Regardless of the form, the notification is aimed to alert the user that a registered, actively tracked item has not been detected and identify the item using its label, stored in the tracking system under the user profile. The notification may be outputted by any electronic device selected by the user (e.g., identified in the user profile). Non-limiting examples of electronic devices may include transmitting a notification to the user's mobile phone, electronic wearable devices (e.g., smart watches), user's personal computers, and users' IoT devices (e.g., personal assistance devices, and/or smart home devices). In some embodiments, the reader itself may output the notification.

Figure 11A:
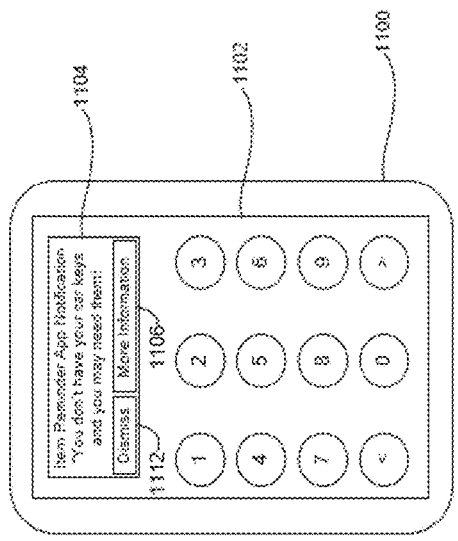
FIG. 11A depicts a notification to be used in a tracking system, according to one embodiment.

FIG. 11A depicts a notification to be used in a tracking system, according to one embodiment. In the embodiment depicted in FIG. 11A, a user interface would display on the locked screen 1102 of a cell phone 1100 a remote notification 1104 that contains a message from the tracking system, such as "You don't have your car keys and you may need them!"

Figure 11B:
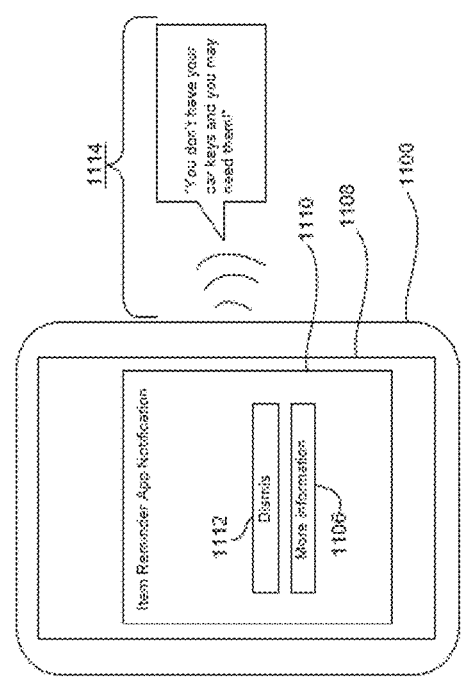
FIG. 11B depicts a notification to be used in a tracking system, according to one embodiment.

FIG. 11B depicts a notification to be used in a tracking system, according to one embodiment. In the embodiment depicted in FIG. 11B, the same message can be read out loud 1114 by the output component of a cell phone 1100, similar to the sounding of an alarm clock. The type of notification can be selected by the user according to the user's preferences. If a user receives a notification for a missing item, the user can choose to act accordingly, by searching for the item, or disregarding/deleting the notification, such as by pressing a Dismiss button 1112 displayed in a remote notification 1104 or on the screen 1108 as part of an item reminder application notification message 1110, or within the application interface. Based on user preferences, a user may be provided with an option to see more information (for example by pressing a More Information button 1106), such as the active tracking condition that led to the notification in order to update it or to simply be reminded why such a check for possession was performed.

Inventory Scan

Figure 12:
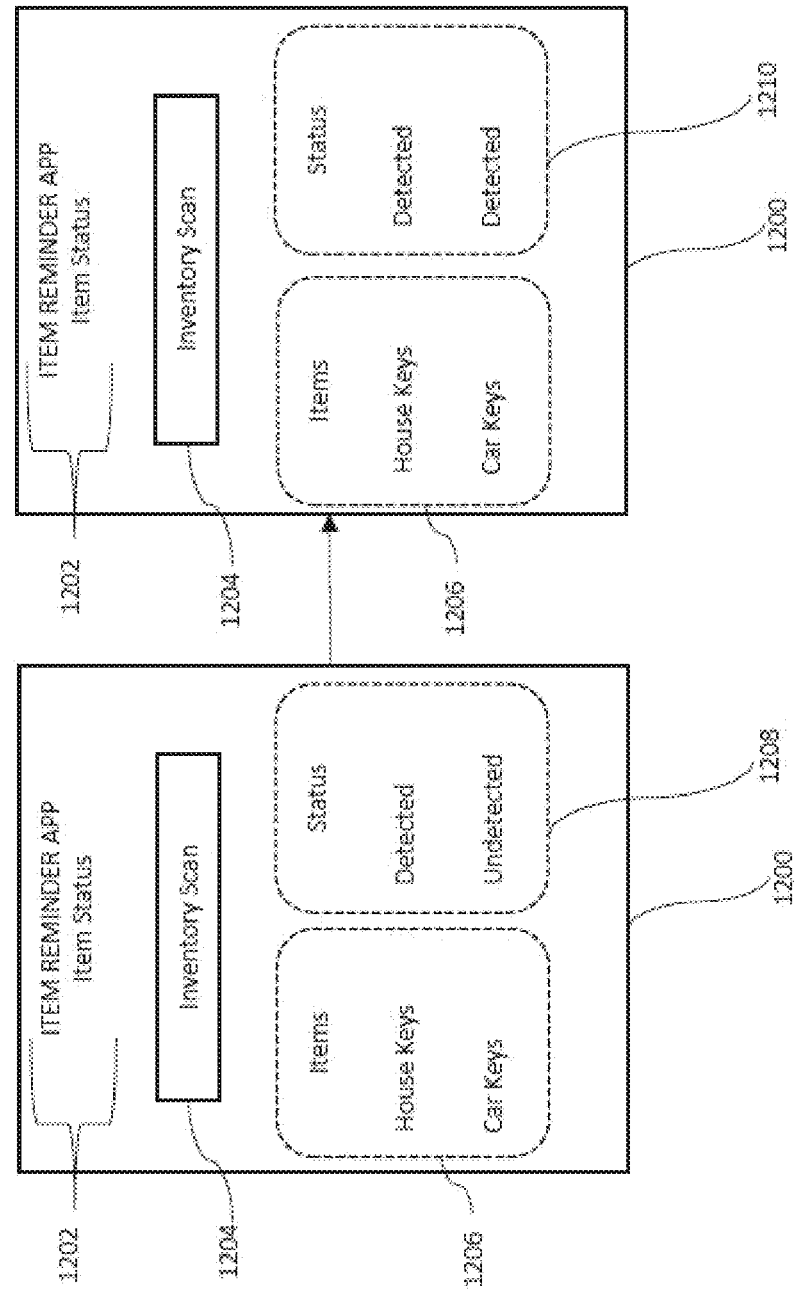
FIG. 12 is a flowchart of an inventory scan process to be used in a tracking system, according to one embodiment.

The system described above fully supports user-prompted inventory scans by a reader. Instead of performing a scan upon the reader's detecting motion, the system can be prompted to perform a scan by the user. The prompt would be input into the system by the user through a user interface once the user has a user profile and at least one reader associated with the user profile. FIG. 12 is a flowchart of an inventory scan process to be used in a tracking system, according to one embodiment. In the embodiment depicted in FIG. 12, a screen 1200 would be displayed to a user, containing the Item Status portion of an item reminder application 1202, containing an Inventory Scan button 1204 which the user can choose to press at any time. When an inventory scan is initiated, the system would cause the associated reader to perform a scan at its predetermined distance and report back to the system the unique identifiers of the tagged items it has detected, regardless of whether the reader is in motion or not. The status 1208 (detected or not detected, based on a previous inventory scan or check for possession) of the registered items 1206 would be updated based on which tags were detected by the reader and would be displayed to the user as an updated status 1210.

Such an inventory scan can be performed, for example, in a situation where the system has notified a user that an item was not detected during a check for possession. The user would then go and locate the missing item and place it where it needs to be (for example, in a user's bag, or in the back of a car). Still, the user may be concerned that while the user was locating the missing item, another item that was originally detected by the reader and not included in the missing item notification may have been misplaced. At this point, however, this item's condition for active tracking may not be true anymore (e.g., the item is supposed to be actively tracked between 9 am and 10 am, and it is now 10:05 am). Thus, the newly misplaced item would not be detected as missing in another check for possession upon the movement of the reader. Therefore, the user may prompt an inventory scan to ensure that all necessary items are located at their proper location.

In another scenario, a user may be forced to leave a hotel room earlier than planned due to a re-scheduled flight. However, a condition is in place for all travel items to be actively tracked at the original expected time of hotel departure, not the new earlier time. The user in this situation may prompt an inventory scan through a reader placed in a piece of luggage and review the list of detected tagged items for assurance that the user has packed everything necessary back into the luggage. This would save the user the inconvenience of going through everything that is already packed in the luggage to make sure a specific item is there. It would also save the user the time to go around the hotel room to check that no item is left in a drawer or accidentally dropped under the bed.

In yet another scenario, a user may simply be unsure of the items that the user has packed and would like to quickly evaluate the contents of the bag before leaving a location. The user could then launch an inventory scan to establish what is present in the bag. This could help the user complete a packing process if the user determines that an item that should be packed was not or simply provide peace of mind that all necessary items have been packed.

An inventory scan can be programmed to be performed not once but multiple times at certain time intervals after the user has initiated this mode of use. Such repeated scans can be useful in situations where the user is likely to want to always know that all tracked items are in the user's possession over a certain period of time. In an example situation, a user has performed an inventory scan upon leaving the user's hotel room for an earlier-than-expected flight (and all actively tracked items have been detected by the reader) but is afraid that while rushing to a taxi or to the airport gate some items might fall out of the user's bag. In another example situation, the user is standing in a packed subway car and is afraid of pickpockets inconspicuously lifting an important tagged item such as a wallet. For the duration of the above scenarios, a user might want to initiate an automatically repeated inventory scan. Alternatively, instead of automatically repeated scans, a tracking system could be configured to initiate a scan even at a very slight motion of the motion detector 308, due to, for example, someone rummaging through the contents of the bag or lifting a registered item out of the bag while the owner is looking away.

Bag Reader

A reader to be placed in a bag has to ensure high accuracy of detecting multiple tagged items that a user might have in the bag, regardless of their orientation inside the bag, relative to the reader or to each other, since items can be cluttered inside the bag throughout the day. The reader itself should not add to the clutter or weight inside the bag. The reader should also ensure high accuracy in detecting tagged items despite the presence of other items that contain metal, fluids or substances that block or diminish the signal from the reader. The reader should be able to withstand tear, wear and smears from its constant physical interaction with items inside the bag. It should be easy to place in the bag and take out, and it should be lightweight. Since this is a consumer product, battery use and life should be optimized for prolonged periods of use of the reader without the need to recharge or replace the battery.

Figure 13:
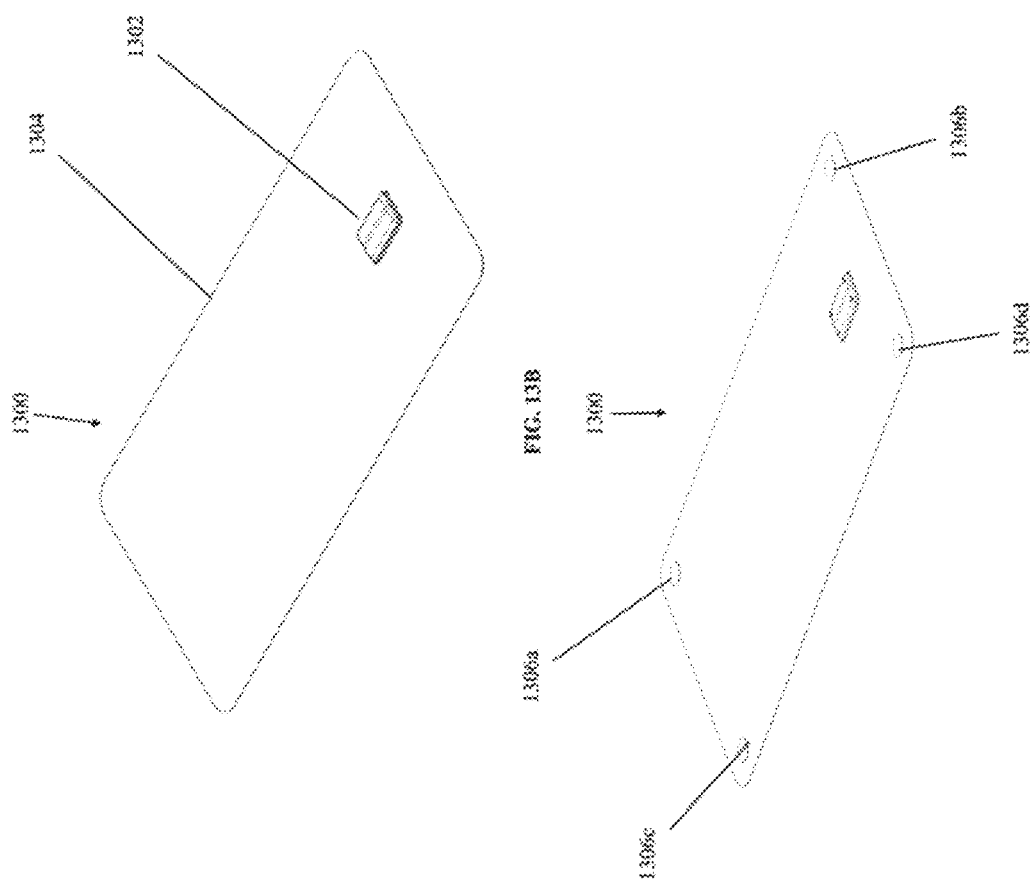
FIG. 13A depicts a configuration to be used in a bag, according to one embodiment.
FIG. 13B depicts attaching a reader to the inside of a bag, according to one embodiment.

FIG. 13A depicts a configuration to be used in a bag, according to one embodiment. The embodiment depicted in FIG. 13A depicts a reader to be used in a bag (herein referred to as "bag reader"). A bag reader comprises an enclosure 1302 (hereafter, the "housing") which houses the electronic components of the reader, and a thin, laminated structure 1304 (hereafter, the "antenna laminate") which houses a coil antenna (one or multiple coils) for the tag-detection function of the reader. The housing 1302, described in more details below, is secured onto the antenna so that the electronic components for the tag-detecting function inside the housing can connect to the coil inside the antenna laminate 1304.

FIG. 13B depicts attaching a reader to the inside of a bag, according to one embodiment. As depicted in FIG. 13B, holders 1306a, 1306b, 1306c and 1306d to attach the reader to the insides of a bag (hereafter, collectively referred to as the "holders" 1306), once the reader is placed inside it, such as Velcro strips, are placed on one side of the antenna laminate 1304.

Figure 14:
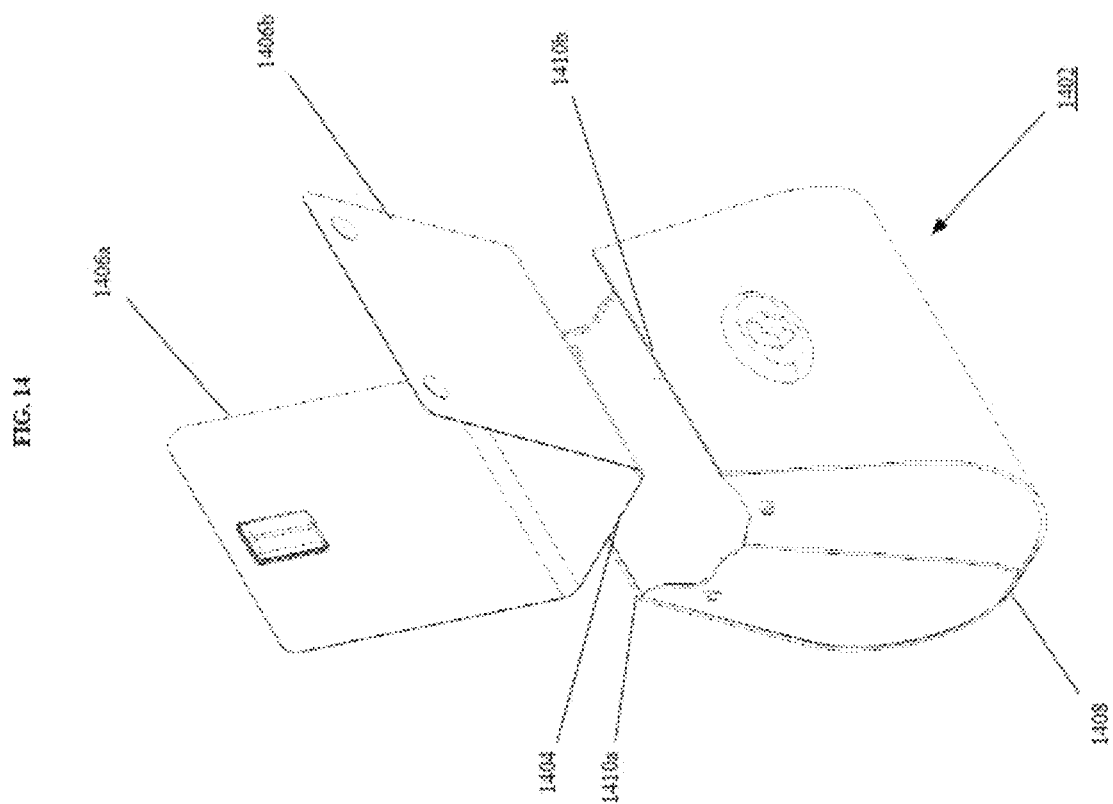
FIG. 14 depicts a representative scenario of a bag reader being prepared to be placed inside a bag, according to one embodiment.

FIG. 14 depicts a representative scenario of a bag reader being prepared to be placed inside a bag, according to one embodiment. FIG. 14 depicts a non-limiting example of a bag reader 1300 being prepared to be placed inside a bag 1402. A bag reader 1300 is placed inside a bag in such a way so that its central portion 1404 (hereafter, the "base") is laid on the bottom 1408 of the bag 1402 and the side portions 1406a and 1406b (hereafter, collectively referred to as the "wings" 1406) of the antenna laminate 1304 line up against the sides 1410a and 1410b of the bag 1402 (hereafter, collectively referred to as the "sides" 1410). The holders 1306 that are placed on the side of antenna laminate 1304 facing the bottom 1408 and the sides 1410 of the bag 1402 are used to secure the bag reader in place.

As depicted, the bag reader 1300 may include multiple planar components (e.g., wings 1406 and the central portion 1404) foldable at an angle to each other. For instance, a user may fold the wings 1406 such that the reader can be inserted into the bag 1402.

In one embodiment, the reader 1300 can comprise a flexible material that allows it be bent, fold, or otherwise reshaped. The antenna within the reader 1300 is also flexible to allow for the reshaping of the reader 1300 into a desirable configuration.

In another embodiment, the reader 1300 can be flexible at joints between the wings 1406. The joints allow the angle between the wings 1406 to change based on a desired configuration, such as a placement in a particular bag.

The reader 1300 can also be constructed with these flexible joints and made of a flexible material to allow for even more configurations. For example, the reader 1300 can be in a convex, concave, U-shape, L-shape, V-shape, or other configuration. In each of these configurations, the antenna within the reader 1300 may be oriented on multiple axes and can be reconfigured for different orientations, but the reader can re-tune for each shape.

Figure 15:
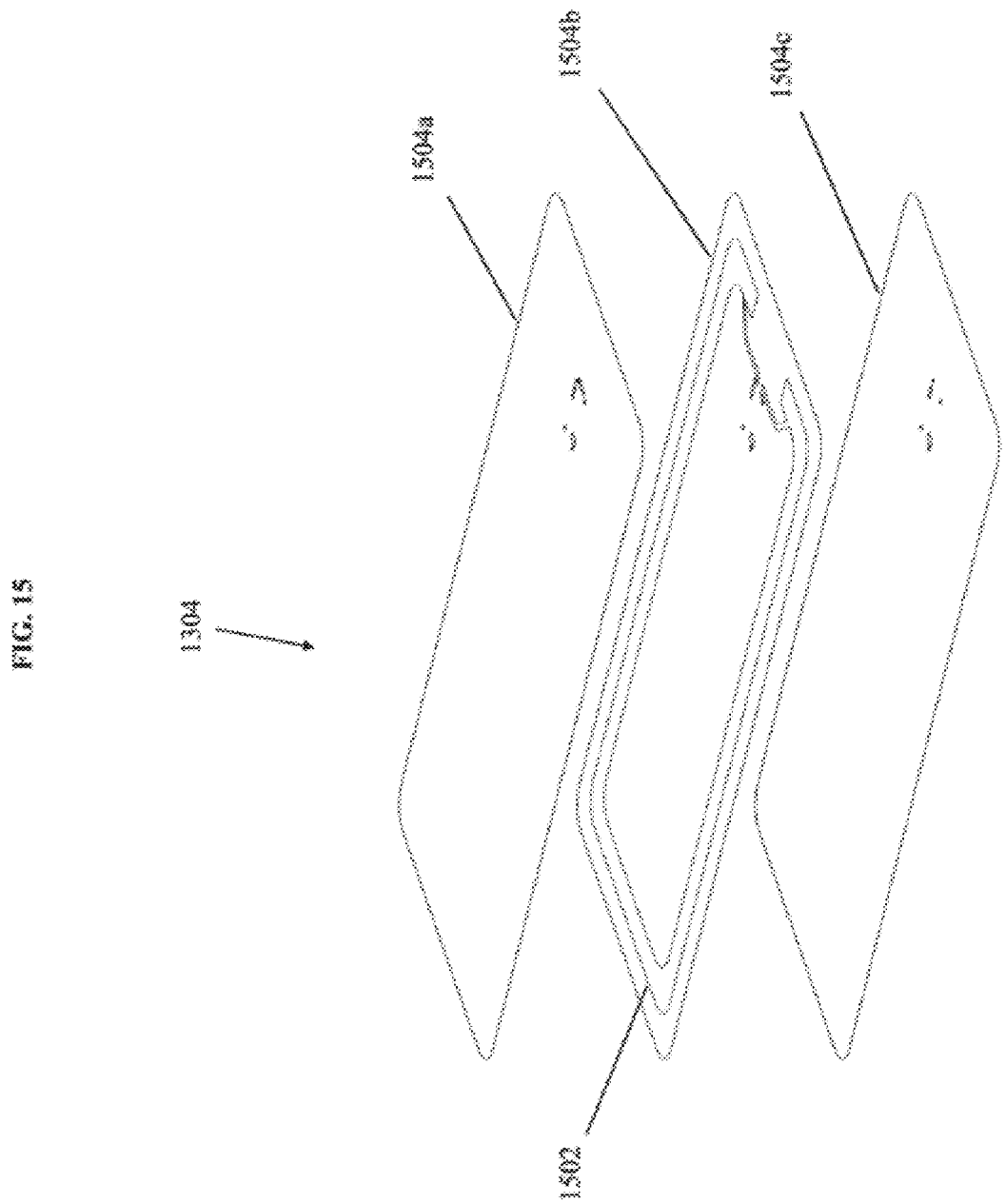
FIG. 15 depicts a structure of an antenna laminate, according to one embodiment.

FIG. 15 depicts a structure of an antenna laminate, according to one embodiment. FIG. 15 depicts a non-limiting example of the structure of an antenna laminate 1304. An antenna laminate 1304 comprises an antenna 1502 (hereafter, the "coil") and layers of protective material 1504a, 1504b and 1504c (hereafter, collectively referred to as the "substrate layers" 1504) on one or both sides of the coil, bound together through lamination. The choice of material for the substrate layers and the number of layers, both of these described further below, allow for different layers of rigidity of the antenna laminate.

Figure 16:
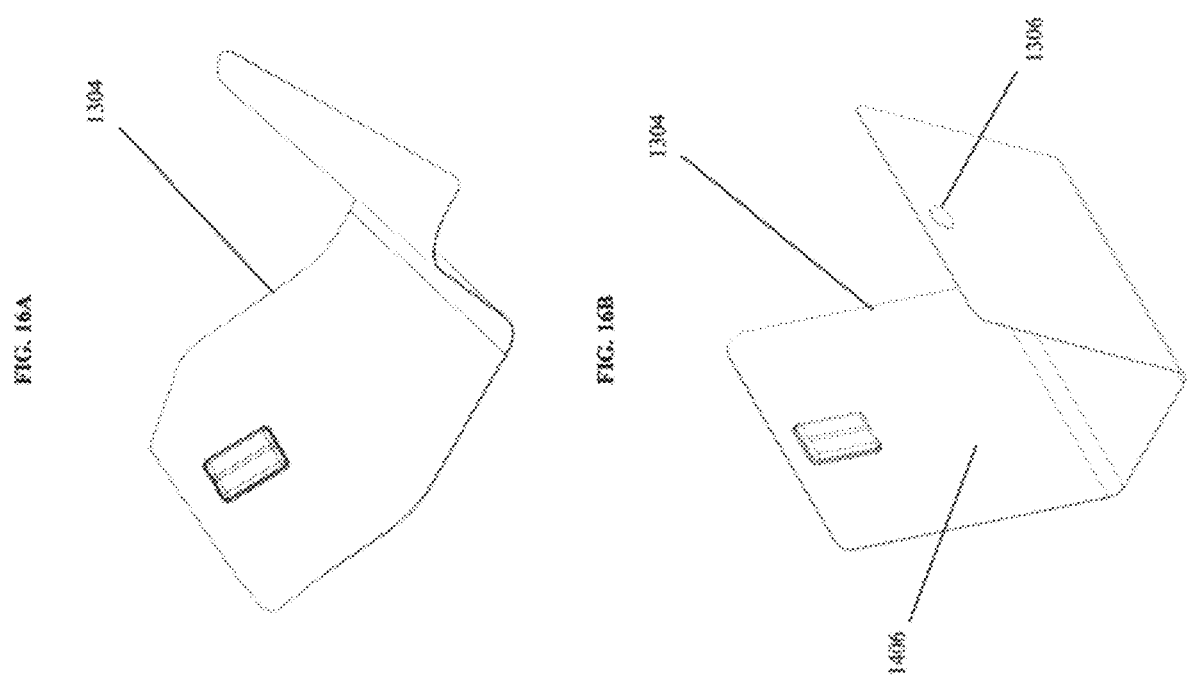
FIG. 16A depicts a bag reader with a less rigid antenna laminate, according to one embodiment.
FIG. 16B depicts a bag reader with a more rigid antenna laminate, according to one embodiment.

FIG. 16A depicts a bag reader with a less rigid antenna laminate, according to one embodiment. FIG. 16A depicts a bag reader 1300 with a less rigid antenna laminate 1304. In one embodiment, a bag that is made of softer material, such as a linen bag, may benefit from a less rigid antenna laminate 1304. Such a bag has less delineation between what is its bottom (which may not be flat) and its sides—when held up, its sides would straighten under its own weight or the weight of its content, and when placed on a flat surface, the lower parts of its sides would spread on the surface and the upper parts would collapse on themselves or cover the contents of the bag. A reader with a less rigid antenna laminate 1304 inside such a bag would allow the antenna laminate 1304 to mirror the different shapes into which the same bag can fall.

FIG. 16B depicts a bag reader with a more rigid antenna laminate, according to one embodiment. FIG. 16B depicts the bag reader 1300 with a more rigid antenna laminate 1304. In another embodiment, a stiff leather tote bag can be equipped with a reader with a more rigid antenna laminate 1304, since it would require fewer holders 1306 to secure the wings along the sides of the bag as the wings 1406 would naturally stand up on their own against the stiff sides of the bag.

A less rigid antenna laminate 1304 can allow the same reader 1300 to be useable with bags that have different bottom widths, since the less rigid antenna laminate can more easily fold and take the shape of different places where bags are placed. A more rigid antenna laminate 1304 would be easier to place in a bag, increasing the positive user experience with readers manufactured to fit specific bag models.

Figure 17:
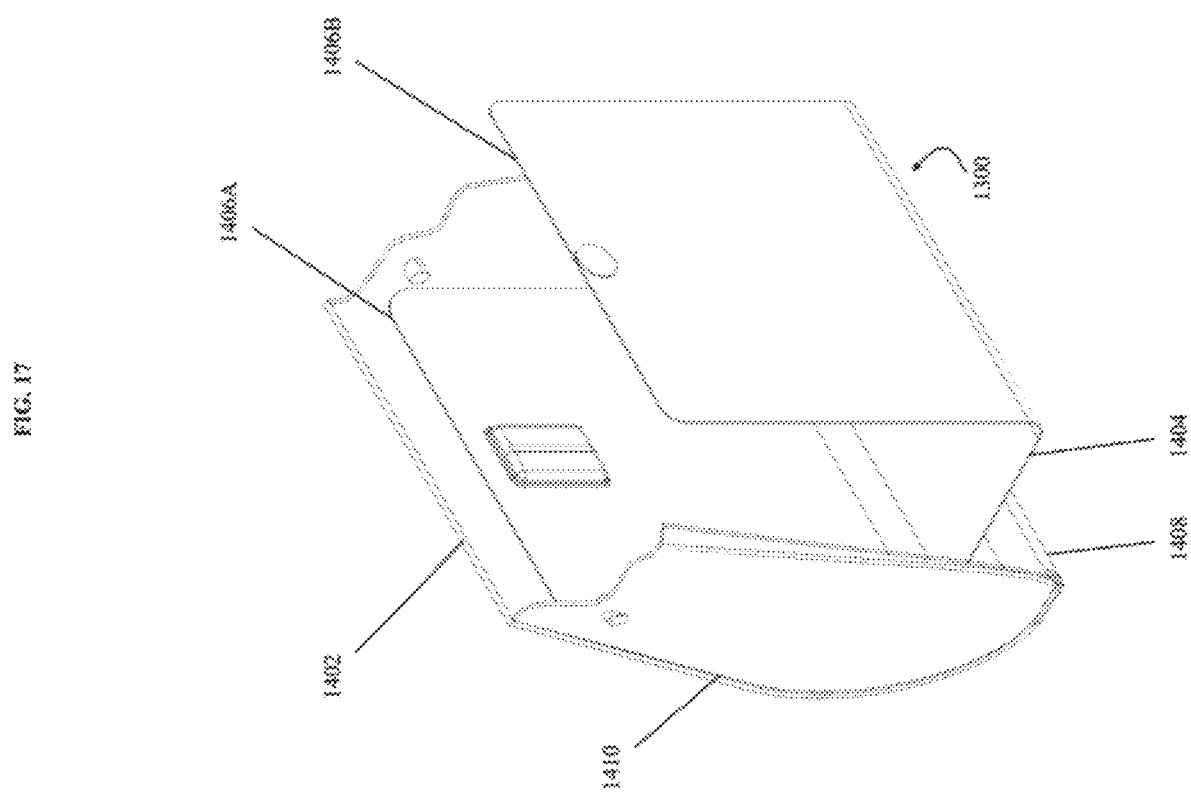
FIG. 17 depicts a rectangular bag reader fitting in a bag, according to one embodiment.

A bag reader 1300 within the scope of the present invention is designed so that when placed inside a bag 1402, the bag reader would permeate as much of the volume of the bag with a magnetic field that is as strong as possible, from as many directions as possible. FIG. 17 depicts a rectangular bag reader fitting in a bag, according to one embodiment. FIG. 17 depicts one embodiment, in which a bag reader 1300 is designed in a rectangular, with a length of up to the sum of twice the height of the bag and a side of its base, and a width of up to the other side of the base of the bag. The reader can then be folded so its base 1404 can be laid on the bottom 1408 of the bag and its wings 1406 line up against two opposing sides of the bag (represented in FIG. 17 by only one of the sides 1410). It should be understood that, for example, a magnetic field can extend several inches about the perimeter of a 1-turn rectangular coil, described in more details below, so the antenna laminate does not have to match the bag exactly. On the other hand, a coil may be made smaller than the perimeter in order to strengthen the field inside of the volume.

Figure 18:
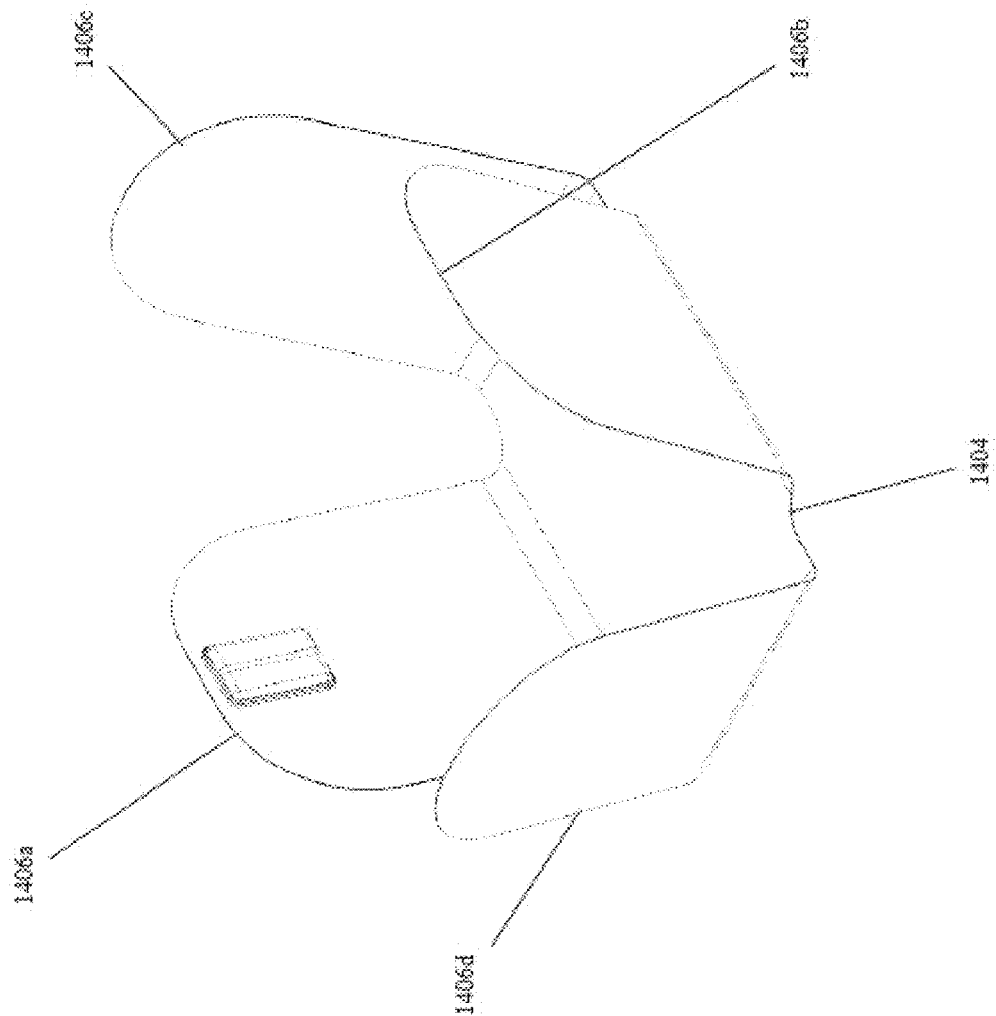
FIG. 18 depicts a bag reader designed in a plus sign shape, according to one embodiment.

FIG. 18 depicts a bag reader designed in a plus sign shape, according to one embodiment. FIG. 18 depicts an embodiment, in which a bag reader is designed in a plus sign shape so that it has a base 1404 and four wings 1406a, 1406b, 1406c and 1406d, each of which lines up against each of the four sides of a bag. While a plus sign shaped bag reader allows more directions of magnetic vectors within a bag, there are some manufacturing considerations, such as creating more waste. A rectangular bag reader can offer a compromise between cost and effectiveness.

Antenna Laminate Materials

A number of commercially available materials can be used to make the substrate layers 1504 for the antenna laminate 1304. In one embodiment, a layer of Tyvek® can be used as the substrate for the coil with additional layers of the same material added and laminated together to reach a desired level of rigidity of the antenna laminate 1304. In other embodiments, PET or PVC films can be used in the same manner, as well as Urethane sheets, vinyl, fabric, or even treated paper. Different materials provide trade-offs between ease of cutting, adhesion properties, burden on the environment, tear and water resistance, costs of production. Those skilled in the art would recognize that the materials described above serve only as an example, and the properties of the reader may be obtained with other materials or combination thereof as well.

Lamination Process

A number of processes are available to create the antenna laminate. A coil is provided in the form of conductive material, which is applied or attached to a substrate layer. As an example, copper tape can be used to create a coil. Other examples include creating a coil using aluminum foil, by inkjet printing of conductive ink, and others. Those skilled in the art would also recognize that applying measures for insulating the conductive material (for example, insulating the copper tape with Kapton tape on top), while not specifically described here, would not depart from the scope of the invention.

An example process for the creation of the antenna laminate begins with printing the layout of the coil in ink on a rectangular piece of Tyvek®. After printing the layout, the inner features (circular and rectangular features that allow the PCB to attach to the feed arms) are cut out from the Tyvek® piece in the appropriate places. Next, the copper tape and Kapton tape are laid on the Tyvek® piece over the printed layout. Any necessary joints are then soldered. Three sheets of Tyvek®, with the one with the copper and Kapton tapes placed in the middle, are laminated together. Heat or adhesive can be applied for this purpose. Using a vinyl cutter, the outer outline of the antenna laminate is cut (for example, a rectangle with rounded edges, or a plus-sign shape, described previously). The antenna laminate is then ready for the housing to be attached to it.

Another example process for creating the antenna laminate includes applying an adhesive in the form of the antenna coil onto an uncoated side of a sheet of Tyvek® or treated paper. Then proceed to silkscreen metal, for example aluminum, over the adhesive, and peel away everything, which is not the coil. Apply adhesive on an uncoated side of another sheet of Tyvek® or treated paper and then silkscreen the two sheets together, the uncoated sides facing each other. Die cut the edges and the inner features. The antenna laminate is then ready for the housing to be attached to it.

Those skilled in the art would recognize that processes described above serve only as an example, and that antenna laminate may be created with fewer or more steps, and or with different processes that apply a thin layer of conductive material in the desired shape for the coil on a substrate layer and binding a selected additional number of substrate layers together with it.

Housing

Figure 19:
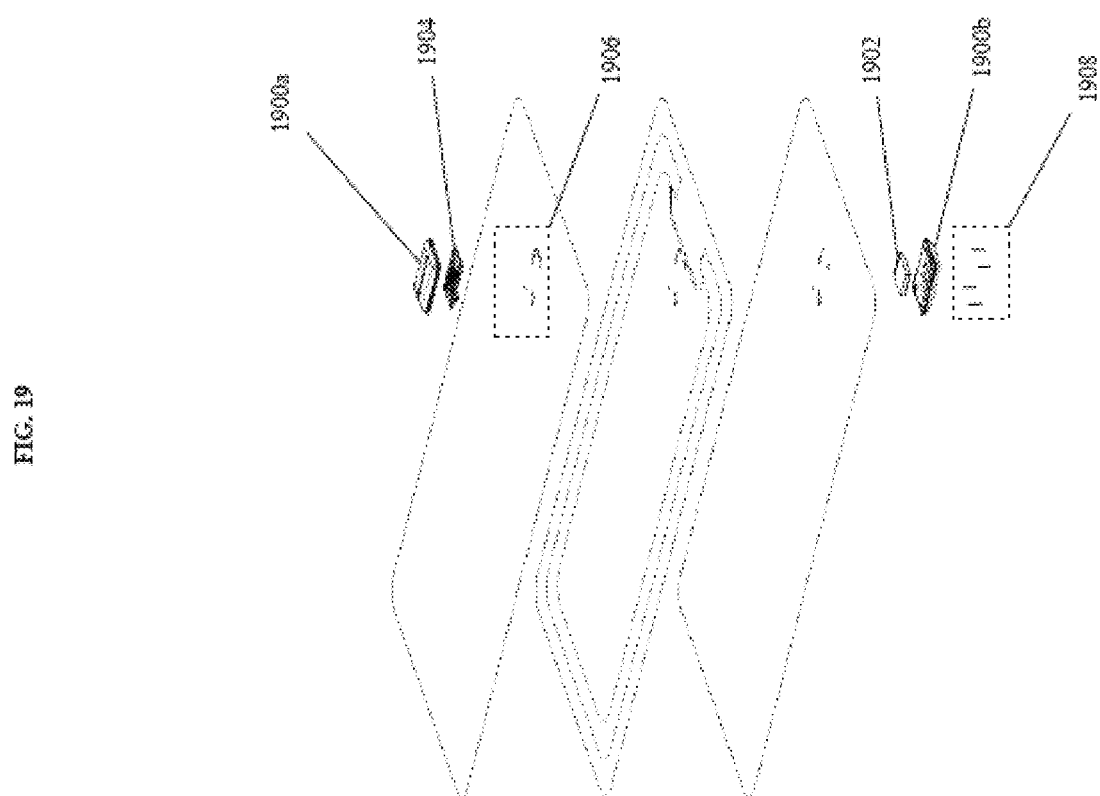
FIG. 19 depicts a configuration of electronic components attached on the surface of an antenna laminate, according to one embodiment.

A housing 1302, with the electronic components, is attached on the surface of an antenna laminate 1304. FIG. 19 depicts a configuration of electronic components attached on the surface of an antenna laminate, according to one embodiment. FIG. 19 depicts an embodiment in which a battery 1902 is placed on one side of the antenna laminate 1304, and the remaining electronic components 1904 are placed on the same area on the other side of the antenna laminate 1304, and each half 1900a and 1900b of a housing 1302 is placed respectively over the battery 1902 and over the remaining electronic components 1904. The appropriate inner feature cutouts 1906 through the antenna laminate 1304 allows the electronic components to connect to the coil using spring contacts, solder, or a conductive adhesive. Any necessary fasteners 1908 hold the two halves of the housing and the components inside together in place. This example arrangement limits the height protrusion of the electronic components over the inner surface of the antenna laminate once the reader is place inside a bag.

The exact spot on the antenna laminate 1304 where the housing 1302 is mounted is selected to be such that when a bag reader is placed inside a bag, the housing is not prevented from being accessible to the user, while allowing the components inside to connect to the outer loop of the antenna. In one example, a housing on a wing would allow a user to observe the housing without emptying their bag in cases where the housing is supplied with an alert mechanism 314. The alert mechanism 314 provides indications to a user of numerous types of events. Such events may include, but are not limited to, a reader's not being able to establish a connection to a mobile device, an reader establishing a connection with a mobile device for initial association, a need to change/recharge a battery, or when one or more actively tracked item or items is not detected. The alert mechanism 314 can be a speaker, a vibrating motor, a light, a screen or display or any other form suitable to alert a user of an event. However, a bag reader that can be re-charged wirelessly may benefit from a housing (with a battery inside it) being mounted on one of the wings 1406, close to the fold with the base 1404, or even on the base 1404 itself to allow re-charging without emptying a bag and taking the reader out by placing the bag on a flat wireless charger. Therefore, the exact placement of the housing on the antenna laminate would be guided based on recharging and alert mechanism considerations, based on the re-charging technology selected and the needs of users to be alerted of specific events from the reader itself. Design and aesthetic considerations can also guide the choice. Additionally, if using an RFID scanner in differential mode, the housing 1302 may be placed near a point of geometry symmetry on the coil 1502 allowing both sides of the scanner's circuitry to detect the same thing. In a configuration which makes use of a single-ended antenna, the positioning of the housing is not guided by such antenna considerations.

The Electronic Components

A bag reader comprises elements described above in FIG. 3A.

Figure 20:
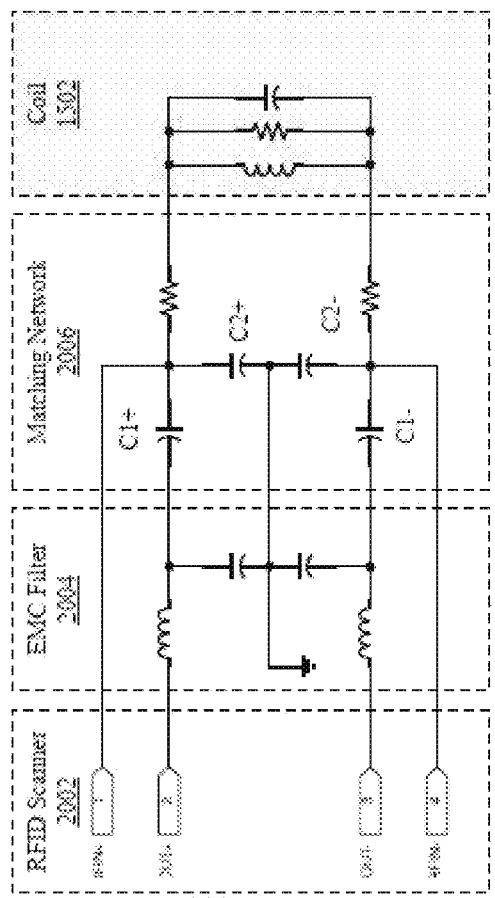
FIG. 20 depicts a configuration of a tag transceiver, according to one embodiment.

FIG. 20 depicts a configuration of a tag transceiver, according to one embodiment. In the embodiment depicted in FIG. 20, a tag transceiver 302 is provided with an RFID Scanner 2002, an EMC filter 2004 and a matching network 2006.

An RFID scanner 2002 drives the EMC filter 2004, matching network 2006, and coil 1502. RFID scanners can generally work in single-ended (e.g., a RF+ and ground into the coil) or differential (RF+ad RF−). Differential is shown in FIG. 20.

As RFID chips drive the coil using rectangular pulses, an EMC filter 2004 is provided to remove higher harmonics from the driving signal.

The automatic frequency tuner can optimize the transmission/receive power of the reader for any shape of the reader. As the shape of the reader changes, the orientation of the antenna or the orientation of a portion of the antenna changes. Accordingly, the automatic frequency tuner adjusts for optimization of that particular shape based on that particular antenna orientation. The automatic frequency tuner can also adjust for any new material introduced into the environment.

In order to deliver optimal power to a coil, the system must tune the coil in order to deliver maximum power and minimize reflection between the coil and reader. This is most commonly done by manipulating the capacitance values in the matching network, usually at points C1+— and C2+— at matching network 2006.

In most RFID applications, tuning is lost by introducing conductive or magnetic material into the environment near the coil (dropping an iPad into a bag). The conductive items are "seen" inductively by the coil, detuning the circuit and decreasing power transition and range. This is called inductive loading.

In a bag reader that has a less rigid, flexible antenna laminate, coil inductance also shifts constantly during movement as the coil geometry is changed.

Tuning is typically performed twice: The matching circuit is grossly tuned during design and manufacture and is driven by board layout and the geometry of the coil. The second time matching is performed is more fine-tuned but is done as a reader is in use. This is most commonly done by:

1) Measuring the phase and/or amplitude at the RF inputs.
2) Adjusting values of the C1, C2 capacitors to minimize phase difference or maximize amplitude difference.

A tag transceiver 302 can be provided that utilizes a switching network to switch combinations of capacitors in and out of positions C1 and C2 (parallel capacitors add), varying the capacitance above some baseline value (C1+Ctune or C2+Ctune). This is done automatically in the scanning process. Another method is to use voltage-controlled capacitors.

Very few application have flexible coils, and so very few applications need to tune RF circuits based upon changes in the actual coil geometry. A less rigid, flexible bag reader may need to automatically tune for both coil geometry and loading.

The Coil(s)

FIG. 21A depicts coil configurations to be used in a rectangular bag reader, according to one embodiment. FIG. 21A depicts a non-limiting configurations of coils to be used in a rectangular bag reader 1300, such as a 1-coil configuration 2102 and a 3-coil configuration 2104. FIG. 21B depicts coil configurations to be used in a plus-shaped bag reader, according to one embodiment. FIG. 21B depicts a non-limiting configurations of coils to be used in a plus-shaped bag reader 1300, such as a 1-coil configuration 2106, a 2-coil configuration 2108 and a 4-coil configuration 2110. For both FIG. 21A and FIG. 21B it should be understood that the coils are shown as placed on one substrate layer for demonstration purposes and that, as explained above, more substrate layers can be added over or under the coil.

The advantage of multiple coils is that multiple read directions allow redundant coverage within a volume, giving more reliable measurement, especially when metal objects are introduced into the bag. RFID scanners can support single or multiple coils and each coil requires a single tuning circuit, explained in more detail above. Design choices could include, for example, wrapping a single coil about as much volume as possible or having multiple coils placed in as many orthogonal planes as possible. For application with multiple coils, scanners typically fire one coil at a time to minimize interference between coils.

What is claimed is:

1. A method comprising:
    in response to receiving an indication that a motion detector has identified a motion of a reader or a processor associated with the reader that satisfies a speed threshold, causing, by the processor, the reader to determine a location of a tracking device using at least one short-range wireless communication protocol, the reader determining whether the tracking device is located within a defined distance, wherein the motion detector is communicatively coupled with the reader;
    determining, by the processor, that the tracking device is not within the defined distance using data received from the reader; and
    outputting, by the processor, a notification comprising an identification of an item associated with the tracking device.

2. The method of claim 1, further comprising:
    receiving, by the processor, an identifier of a second tracking device or the tracking device from an online merchant; and
    automatically adding, by the processor, the second tracking device or the tracking device to a profile of a user.

3. The method of claim 1, wherein the tracking device and the reader communicate via an antenna and a transceiver.

4. The method of claim 1, wherein the tracking device is physically associated with the item and the notification comprises the identification of the item.

5. The method of claim 4, wherein the item is at least one of a key, a wallet, glasses, a passport, an identification card, a document, a clothing item, and a camera.

6. The method of claim 1, wherein the reader is physically associated with a first item and the tracking device is physically associated with a second item.

7. The method of claim 1, wherein the motion detector uses at least one a global positioning satellite system, an accelerometer, a gyroscope, and a magnetometer to determine whether the motion satisfies the speed threshold.

8. The method of claim 1, wherein outputting the notification comprises at least one of displaying a text notification, displaying a graphical notification, outputting an audio signal, and outputting a sensory notification.

9. The method of claim 1, wherein the processor and at least one of the motion detector or the reader are associated with a mobile device.

10. The method of claim 1, further comprising:
    identifying, by the processor using the reader, whether the tracking device is designated as active within a profile of a user, wherein the processor only outputs the notification when the tracking device is designated as active.

11. A method comprising:
    in response to receiving, from a motion detector, an indication that a motion of a reader or a processor associated with the reader satisfies a speed threshold, causing, by the processor, the reader to detect a set of tracking devices using at least one short-range wireless communication protocol, wherein the motion detector is communicatively coupled with the reader;
    receiving, by the processor, a transmission of a first subset of tracking devices that the reader detects; and
    outputting, by the processor, a notification comprising an identification of at least one item associated with a second subset of tracking devices that the reader does not detect.

12. The method of claim 11, further comprising:

outputting, by the processor, an active tracking status of at least one tracking device within the set of tracking devices.

13. The method of claim 11, wherein the processor only outputs the notification corresponding to a tracking device when the tracking device is designated as active.

14. The method of claim 13, wherein the processor receives an active tracking status from an electronic device.

15. The method of claim 13, wherein the processor determines an active status of at least one tracking device based on a criterion corresponding to at least one of a defined time period, a defined day, a defined date, or a defined calendar event.

16. The method of claim 11, further comprising:

receiving, by the processor, an identifier of a tracking device from an online merchant; and automatically adding, by the processor, the tracking device to the set of tracking devices based on its identifier.

17. The method of claim 11, wherein the at least one item is at least one of a key, a wallet, glasses, a passport, an identification card, a document, a clothing item, and a camera.

18. The method of claim 11, wherein the motion detector uses at least one a global positioning satellite system, an accelerometer, a gyroscope, and a magnetometer to determine whether the motion satisfies the speed threshold.

19. The method of claim 11, wherein outputting the notification comprises at least one of displaying a text notification, displaying a graphical notification, outputting an audio signal, and outputting a sensory notification.

20. The method of claim 11, wherein the processor and at least one of the motion detector or the reader are associated with a mobile device.

* * * * *